(12) United States Patent
Maningat et al.

(10) Patent No.: US 11,968,998 B2
(45) Date of Patent: Apr. 30, 2024

(54) L-CYSTEINE-TREATED PROTEINS WITH ALTERED FUNCTIONALITIES AND PREPARATIONS THEREOF

(71) Applicant: MGPI Processing, Inc., Atchison, KS (US)

(72) Inventors: Clodualdo C. Maningat, Platte City, MO (US); Liming Cai, Atchison, KS (US); Sarah Marie Gutkowski, Atchison, KS (US); Michael Buttshaw, Lenexa, KS (US)

(73) Assignee: MGPI PROCESSING, INC., Atchison, KS (US)

( * ) Notice: Subject to any disclaimer, the term of this patent is extended or adjusted under 35 U.S.C. 154(b) by 793 days.

(21) Appl. No.: 15/951,249

(22) Filed: Apr. 12, 2018

(65) Prior Publication Data

US 2018/0295857 A1    Oct. 18, 2018

Related U.S. Application Data

(60) Provisional application No. 62/485,048, filed on Apr. 13, 2017.

(51) Int. Cl.
| | |
|---|---|
| *A23J 3/18* | (2006.01) |
| *A21D 2/26* | (2006.01) |
| *A23J 3/08* | (2006.01) |
| *A23J 3/10* | (2006.01) |
| *A23J 3/14* | (2006.01) |

(Continued)

(52) U.S. Cl.
CPC ............... *A23J 3/18* (2013.01); *A21D 2/262* (2013.01); *A21D 2/263* (2013.01); *A21D 2/265* (2013.01); *A21D 2/266* (2013.01); *A23J 3/08* (2013.01); *A23J 3/10* (2013.01); *A23J 3/14* (2013.01); *A23J 3/16* (2013.01); *A23J 3/22* (2013.01); *A23L 29/045* (2016.08); *A21D 2/261* (2013.01); *A23P 30/40* (2016.08)

(58) Field of Classification Search
CPC ..................................... A23J 3/14; A23J 3/18
See application file for complete search history.

(56) References Cited

U.S. PATENT DOCUMENTS

| | | | |
|---|---|---|---|
| 3,803,326 A | * | 4/1974 | Craig et al. ............. A21D 2/00 426/21 |
| 3,965,268 A | | 6/1976 | Stocker et al. |

(Continued)

FOREIGN PATENT DOCUMENTS

| | | |
|---|---|---|
| CN | 101161114 | 4/2008 |
| CN | 102428987 | 5/2012 |

OTHER PUBLICATIONS

Naveen et al., "Effect of Reducing Agents on Wheat Gluten and Quality Characteristics of Flour and Cookies", AUDJG-Food Technology, 37(2), 2013, pp. 68-81 (Year: 2013).*

(Continued)

*Primary Examiner* — Elizabeth Gwartney
(74) *Attorney, Agent, or Firm* — Stinson LLP

(57) ABSTRACT

High-protein food additives are prepared by reacting a protein material with L-cysteine, or a derivative thereof, with homogenization and heating. The homogenization and heating is preferably carried out on an aqueously slurry of the protein material and L-cysteine. The homogenized and reacted slurry is then dried to form a powder. The resultant food additive may be incorporated into a wide variety of food products to enhance the physical characteristics thereof.

35 Claims, 38 Drawing Sheets

(51) Int. Cl.
*A23J 3/16* (2006.01)
*A23J 3/22* (2006.01)
*A23L 29/00* (2016.01)
*A23P 30/40* (2016.01)

(56) References Cited

U.S. PATENT DOCUMENTS

| | | | |
|---|---|---|---|
| 4,145,455 | A | 3/1979 | Fujimaki et al. |
| 4,405,648 | A | 9/1983 | Atsumi et al. |
| 4,643,900 | A | 2/1987 | Porter |
| 4,847,104 | A | 7/1989 | Benjamin et al. |
| 4,957,750 | A | 9/1990 | Cochran et al. |
| 5,451,413 | A | 9/1995 | Fok et al. |
| 5,510,126 | A | 4/1996 | Van Eijk et al. |
| 5,629,023 | A | 5/1997 | Bland |
| 5,736,178 | A | 4/1998 | Cook et al. |
| 6,835,558 | B2 | 12/2004 | Van Lengerich et al. |
| 6,896,916 | B2 | 5/2005 | Cooper |
| 8,551,544 | B2 | 10/2013 | Borders et al. |
| 8,827,930 | B2 | 9/2014 | Wekell |
| 2003/0152676 | A1 | 8/2003 | Yajima et al. |
| 2006/0141126 | A1 | 6/2006 | Levin et al. |
| 2009/0142465 | A1 | 6/2009 | Sturkenboom et al. |
| 2014/0141474 | A1 | 5/2014 | Reutter-Maier et al. |
| 2014/0255590 | A1 | 9/2014 | Carson et al. |

OTHER PUBLICATIONS

Bauer et al., "Studies on Effects of Microbial Transglutaminase on Gluten Proteins of Wheat. I. Biochemical Analysis", Cereal Chem., 80(6), 2003, pp. 781-786. (Year: 2003).*

International Search Report and Written Opinion dated Jul. 30, 2018, in PCT/US18/27223, filed Apr. 12, 2018.

Wieser, "The use of redox agents in breadmaking", Breadmaking: Improving Quality $2^{nd}$ Edition, p. 447- 469, S.P. Cauvain, ed., Woodhead Publishing: Philadelphia, PA (2012).

Frater, et al., "Role of disulphide exchange reactions in the relaxation of strains introduced in dough", J. Sci. Food Agric. 12:269-273 (1961) (5 pgs).

Pomeranz, Wheat: Chemistry and Technology ($3^{rd}$ ed., vol. 11), St. Paul, MN: American Associations of Cereal Chemists, Inc. (1988) (575 pgs).

Ravi, et al., "Influence of additives on the rheological characteristics and baking quality of wheat flours", Eur. Food Res. Technol. 2013(3):202-208 (2000).

Elkhalifa, et al., "Effect of cysteine on bakery products from wheat-sorghum blends", Food Chem 77:133-137 (2002) (6 pgs).

Hamaker, et al., "Improving the in vitro protein digestibility of sorghum with producing agents", Proc. Natl. Acad. Sci. 84:626-628 (1987).

Ravi, et al., "Use of Rapid Visco Analyzer (RVA) for measuring the pasting characteristics of wheat flour as influenced by additives," J. Sci. Food Agric. 79(12):1571-1576(1999).

Elkhalifa, et al., "Effect of cysteine on bakery products from wheat-sorghum blends", Elsevier Science Lt., Food Chemistry 77 (2002), pp. 133-137 (6 pgs).

Hamaker, et al., "Improving the in vitro protein digestibility of sorghum with reducing agents", Proc. Natl. Acad. Sci. vol. 84, Feb. 1987, pp. 626-628 (3 pgs).

Kumar, N., et al., "Effect of Reducing Agents on Wheat Gluten and Quality Characteristics of Flour and Cookies", AUDJG-Food Technology, 37(2), 2013, pp. 68-81 (14 pgs).

* cited by examiner

L-CYSTEINE-TREATED PROTEINS WITH ALTERED FUNCTIONALITIES AND PREPARATIONS THEREOF

BACKGROUND OF THE INVENTION

Field of the Invention

The present invention is generally directed toward a protein composition with altered functional properties that is prepared by homogenization of the protein or protein mixtures in acidic, neutral or alkaline conditions, treating with vegetable-sourced L-cysteine that is capable of reducing the disulfide bonds of the protein, followed by heat treatment, and spray drying or flash drying the homogenized slurry to yield the dry protein product. The L-cysteine treatment produces a protein product uniquely different from the parent protein(s) as it relates to dough rheology, emulsification, water holding, oil holding, whipping, and baking performance.

Description of the Prior Art

The baking industry plays a significant and dominant role in the U.S. economy with more than 700 baking facilities and baking company suppliers that produce bread, rolls, crackers, bagels, sweet goods, tortillas and many other wholesome and nutritious baked products. American Bakers Association (ABA) 2017. Washington, D.C. www.americanbakers.org. It generates more than $102 billion in direct annual economic activity and employs over 706,000 highly-skilled people. During the manufacture of whole wheat or white bread and other bakery products, there are several ingredients added to improve the appearance, volume, crumb properties, texture, shelf-life and overall quality of the finished product. These additives come in the form of improvers, oxidizing agents, reducing agents, relaxers, conditioners, surfactants/emulsifiers, softeners, enzymes, preservatives or those that delay the staling of the bread.

There are several known reducing agents, namely sodium bisulfite, sodium metabisulfite, L-cysteine, glutathione, 2-mercaptoethanol and dithiothreitol among others. Sulfites are widely used in the food industry, but it is considered an allergen and particularly has a serious health effect on individuals suffering from asthma. Any sulfiting agent that has been added to any food or to any ingredient in any food must be declared in the label when the concentration is 10 ppm or more of the sulfite in the finished food according to 21 CFR 101.100(a)(4). Glutathione is used in foods either in its isolated form or as a component of yeast or yeast extracts. Dithiothreitol and 2-mercaptoethanol are not commonly used because they are not of food-grade quality L-Cysteine is one of the three sulfur-containing amino acids besides methionine and cystine (oxidized dimer of cysteine). Its use in the food industry is covered in the Code of Federal Regulations Title 21 Part 172.320. For many years, the L-cysteine that was commonly used in the baking industry was derived or extracted from human hair, duck feathers, or hog hair. When added to bread formulas, the level of usage is approximately 10-90 ppm based on wheat flour. Recently, a vegetarian (non-animal) source of L-cysteine was developed (Wacker Chemie AG, Munchen, Germany). L-cysteine (CAS #52-90-4; molecular weight, 121.16 g/mol), L-cysteine hydrochloride (CAS #52-89-1; molecular weight, 157.61 g/mol), and L-cysteine hydrochloride monohydrate (CAS #7048-04-6; molecular weight, 175.63 g/mol) were produced from L-cystine by electrochemical reduction without the use of any GMO material. The commonly available commercial product from Wacker Chemie AG is L-cysteine hydrochloride monohydrate. It contains 68.99% of pure L-cysteine.

L-cysteine is a reducing agent added to yeast-leavened formulas to shorten mix time and improve dough extensibility. According to Wieser (2012), the sulfhydryl group in L-cysteine chemically disrupts disulfide bridges from forming between gluten proteins and prevents them from reforming during proofing. Wieser, H., "The use of redox agents in breadmaking," Breadmaking: Improving Quality, $2^{nd}$ Edition., p. 447-469, S. P. Cauvain, ed., Woodhead Publishing: Philadelphia, PA (2012).

Frater and co-workers (1961) noted that addition of cysteine to wheat flour accelerates stress relaxation and structural relaxation. Frater, R. et al., Role of disulphide exchange reactions in the relaxation of strains introduced in dough, J. Sci. Food Agric. 12:269-273 (1961). In agreement with Wieser, Pomeranz reported that cysteine reduces the mixing time of the dough and it reacts with wheat proteins by splitting disulfide bonds and aiding in rapid dough development. Pomeranz, Y., Wheat: Chemistry and Technology ($3^{rd}$ ed., Vol. 11), St. Paul, MN, USA: American Associations of Cereal Chemists, Inc. (1988).

Incorporation of L-cysteine hydrochloride reduced the water absorption capacity and stability of weak and medium-strong wheat flours. Ravi, R., et al., Influence of additives on the rheological characteristics and baking quality of wheat flours, Eur Food Res Technol 210(3):202-208 (2000). In general, the use of L-cysteine hydrochloride reduced the resistance to extension of the dough, increased the extensibility of the dough and improved bread volume. In a separate study by the same authors, L-cysteine hydrochloride when added at 0.060 g/kg was shown to reduce the RVA peak viscosity of wheat flour. Ravi, R. et al., Use of Rapid Visco Analyzer (RVA) for measuring the pasting characteristics of wheat flour as influenced by additives. J. Sci. Food Agric. 79(12):1571-1576 (1999).

Addition of 5% sorghum flour and 30 ppm cysteine to wheat flour gave acceptable bread using a straight dough method. Elkhalifa, A. E. O. et al., Effect of cysteine on bakery products from wheat-sorghum blends, Food Chem 77:133-137 (2002). A higher addition of sorghum flour (10%) and cysteine (60 ppm) is needed to give bread of high quality using a chemical dough development method.

L-cysteine as well as other reducing agents such as 2-mercaptoethanol, dithiothreitol and sodium bisulfite increased the in vitro protein digestibility of sorghum proteins. Hamaker, B. R. et al., Improving the in vitro protein digestibility of sorghum with producing agents, Proc. Natl. Acad. Sci. 84:626-628 (1987). The addition of reducing agents appears to prevent the formation of protein polymers linked by disulfide bonds.

U.S. Pat. No. 3,965,268 describes the preparation of an expanded protein product from soy grits using extrusion technology in the presence of 0.2% cysteine. The expanded product had a porous, cellular structure with crisp, crunchy texture and has applications in convenience foods, snacks, meat-like products and pet foods.

U.S. Pat. No. 4,145,455 reports on modified protein compositions produced by contacting water-soluble proteins from plants, animals and microbial sources with at least 1% plastein (cysteine-enriched). The plastein product is prepared by hydrolyzing a protein with an enzyme having an endo peptidase activity and subjecting the hydrolysate to dehydration-condensation with a protease having an esterase activity in the presence of an activated cysteine (e.g. lower alkyl cysteinate, N-acetyl-L-cysteine or L-cysteinyl-L-cysteine).

U.S. Pat. No. 5,736,178 demonstrates the efficacy of cysteine as colloidal dispersion stabilizer. The colloidal dispersion is used to form films on a variety of surfaces to provide resistance to moisture, lipid and gas permeation as well as provide a glossy sheen to the substrate.

U.S. Pat. No. 8,827,930 describes a free-flowing composition consisting of different proportions of wheat protein isolate, silicon dioxide, propylene glycol monoester, mono/diglycerides and lecithin for use in reducing or replacing the egg and emulsifier content of baked goods.

U.S. Pat. No. 8,551,544 reports on a binder or coating system comprising a modified wheat protein isolate for use in nutritional or protein bars, snacks, and cereal clusters.

U.S. Pat. No. 5,510,126 compares the performance of a new yeast derivative (1%) and L-cysteine (30 ppm) when added in a flour tortilla formula.

In U.S. Pat. No. 4,643,900, L-cysteine (30-45 ppm) was compared with dehydrated garlic powder (0.01-0.25%) as a dough conditioner in bread making for reducing mixing time for complete dough development. In addition, their rheological properties in a Farinograph and an Extensigraph were evaluated. Both ingredients reduced mixing time during bread making and during testing in the Farinograph. The Extensigraph data indicates that the resistance to extension of the doughs decreased with increasing levels of dough conditioners and improved the extensibility of the doughs at all levels tested.

U.S. Patent Application 2009/0142465 describes a method to produce a flour tortilla that contains 20 ppm of L-cysteine to improve machinability and decrease elasticity of the dough.

U.S. Pat. No. 5,451,413 discusses a method for improving the rheological properties of dough and quality of baked products by addition of a yeast derivative, preferably in combination with L-cysteine (25 ppm) and/or enzyme preparations having amylase, hemicellulose, oxidoreductase and/or protease activities.

In U.S. Pat. No. 4,847,104, a frozen dough composition (leavened or unleavened) is developed that can withstand 16 weeks of frozen storage while maintaining good baked, end-product results. L-cysteine is added at 60 ppm in the frozen dough formula.

U.S. Pat. No. 4,405,648 describes a method of producing bread comprising the steps of 1) kneading a dough containing wheat flour with an additive mixture consisting of L-ascorbic acid, a reducing agent and a thickener, 2) allowing the kneaded dough to ferment, and 3) baking the fermented dough. L-cysteine, a reducing agent, is used at 10 ppm level.

U.S. Pat. No. 3,803,326 claims a process for making leavened bread or similar bakery products with greatly reduced but controllable mixing and proofing requirements to yield bakery products of desired reproducible properties. The formula contains a complex additive composition one of which is L-cysteine that is added at 30-100 ppm level.

The invention in U.S. Pat. No. 4,957,750 describes refrigerated, frozen or shelf stable improved baked goods which substantially retain upon microwave heating. The formula contains a protein modifier, L-cysteine, added at a preferred level of 220 ppm.

U.S. Pat. No. 6,896,916 reports a method of baking yeast-leavened frozen bread products. Special ingredients are added like gluten, oxidant, enzymes, gum, and L-cysteine (10-100 ppm).

As clearly evident from the above, published information in scientific journals and patent literature describe the addition of L-cysteine in its isolated form in bakery or food formulas as a dough relaxer or reducing agent (to reduce the disulfide bonds of wheat gluten or other protein sources) and consequently influence the dough handling and final properties of the finished product. No information is currently available on homogenizing plant-based proteins, animal-based proteins or protein mixtures in acidic, neutral or alkaline aqueous solutions, treating with L-cysteine, heating the homogenized slurry, isolating the L-cysteine-treated protein product as a dry powder, and then adding the dry L-cysteine-treated protein composition to bread or food formulas to evaluate the performance of this additive in foods.

SUMMARY OF THE INVENTION

According to one embodiment of the present invention there is provided a food additive comprising at least one protein material that is homogenized and reacted with from about 0.001% to about 3.3% by weight of L-cysteine, or a derivative thereof, based on the total solids content of the food additive. The at least one protein material has a protein content of at least 50% by weight based on the total solids content of the at least one protein material. The food additive comprises less than 30% by weight starch.

According to another embodiment of the present invention there is provided a food additive prepared by forming an aqueous slurry comprising at least one protein material having a protein content of at least 50% by weight. A quantity of L-cysteine, or a derivative thereof, is added to the slurry. The slurry is homogenized and heated to a temperature of from about 120° F. to about 212° F. so as to reduce disulfide bonds within the protein material.

According to still another embodiment of the present invention there is provided a method of preparing a food additive. The method comprises forming an aqueous slurry comprising at least one protein material having a protein content of at least 50% by weight, and adding to the aqueous slurry a quantity of L-cysteine, or a derivative thereof. The slurry is homogenized and heated to a temperature of from about 120° F. to about 212° F. so as to reduce disulfide bonds within the protein material.

DETAILED DESCRIPTION OF THE PREFERRED EMBODIMENT

Figure 1A:
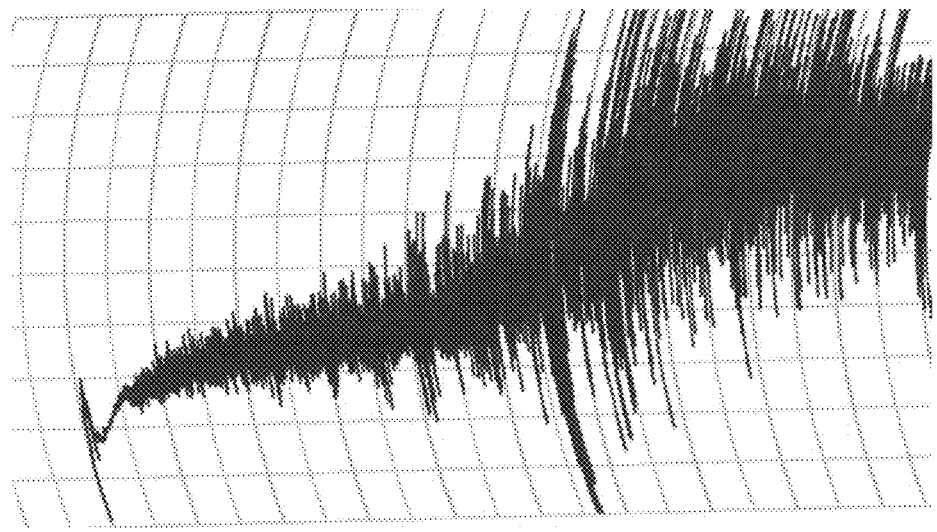
FIGS. 1(*a*) and (*b*) depict typical mixograph curves of regular (or vital) wheat gluten and a wheat protein isolate, respectively.

In particular embodiments of the present invention, a high-protein, food additive composition with altered functional properties as compared with those of the starting materials is prepared by homogenizing a protein material or mixture of protein materials in water under acidic, neutral or alkaline conditions to form a slurry. The slurry is reacted with L-cysteine to reduce the disulfide bonds of the proteins. The homogenized slurry is heated and then dried to yield a dry protein product. As used herein, homogenization refers to a process whereby a biological sample is brought to a state such that all fractions of the sample are equal in composition. A homogenized slurry is mixed so well that removing some of the sample does not alter the overall molecular make-up of the slurry.

Wheat gluten proteins are insoluble in water and form a cohesive, viscoelastic dough mass that are associated by strong covalent and non-covalent bonds and low content of charged amino acid residues. This dough matrix is elastic, allowing it to stretch and expand and resist dispersion. To use a propeller-type mixer to homogenize wheat gluten proteins is not sufficient. A high shear mixer is required that performs both mechanical shearing and fluid shearing. Particularly, a homogenizer comprises a single apparatus that performs mixing, dispersing and milling all at the same time.

The L-cysteine-treated protein product behaves differently than the parent protein and possesses unique emulsification, water holding, oil holding, and/or whipping properties. When added to a bread formula, the treated protein composition reduces dough mixing time, enhances loaf volume, and/or partially or totally replaces emulsifiers like diacetyl tartaric acid ester of mono- and diglycerides (DATEM) and sodium stearoyl lactylate (SSL).

Suitable plant-based or animal-based proteins or their mixtures can be used with the present invention. In certain embodiments, the at least one protein material is a plant-based protein, such as those selected from the group consisting of grain proteins, pseudocereal proteins, pulse proteins, chia seed, lupin, microalgae, soy, canola, mycoproteins and mixtures thereof. In particular embodiments, the plant-based protein comprises a protein derived from wheat, corn, rice, barley, rye, triticale, sorghum, oats, pearl millet, ancient grains, amaranth, buckwheat, quinoa, pea, lentil, faba bean, chickpea, or combinations thereof. In still further embodiments, the plant-based protein comprises one or more members selected from the group consisting of wet gluten dough, high-protein wet gluten dough, vital wheat gluten, and wheat protein isolate.

Exemplary plant-based protein materials include regular wet gluten dough (about 30% solids and 75% protein, N×5.7, dry basis) and/or high-protein wet gluten dough (about 30% solids and 90% protein, N×6.25, dry basis), regular wheat gluten (also called vital wheat gluten) (about 75% protein, N×5.7, dry basis; pH=6.5), Arise® 8000 (a high-protein wheat gluten (also called wheat protein isolate) with about 90% protein, N×6.25, dry basis; pH=6.4), Arise® 5000 (about 90% protein, N×6.25, dry basis; pH=4.5; Ingredient declaration: wheat protein isolate (wheat gluten, lactic acid, sulfite)), Prolite® 100 (about 90% protein, N×6.25, dry basis; pH=4.5; Ingredient declaration: wheat protein isolate (wheat gluten, lactic acid, sulfite)) and Arise® 6000 (about 85% protein, N×6.25, dry basis; pH=6.6; Ingredient declaration: wheat protein isolate (wheat gluten, phosphate, lactic acid, sulfite)). Prolite® 100 is obtained from ADM Company (Decatur, IL) and all the other aforementioned proteins are available from MGP Ingredients, Inc. (Atchison, KS). Various sulfite-treated proteins are described in U.S. Pat. No. 8,309,152, incorporated by reference herein in its entirety. Additional proteins that may be used with the present invention include pulse proteins (pea protein, lentil protein, faba bean protein, chick pea protein, and lupin protein), potato protein, sunflower protein, pumpkin protein, soy protein, corn protein, barley protein, rye protein, oat protein, rice protein, sorghum protein, pearl millet protein, triticale protein, canola (rapeseed) protein, coconut protein, cranberry protein, pomegranate protein, flaxseed protein, almond protein, cashew protein, ancient grain/pseudocereal proteins (chia protein, spelt protein, amaranth protein, quinoa protein, teff protein and buckwheat protein), and proteins from fungi and microalgae.

In certain embodiments of the present invention, the at least one protein material is an animal-based protein. In particular embodiments, the animal-based protein comprises a milk protein, such as casein, whey, or combinations thereof, or an egg protein.

In certain embodiments, the protein materials have protein contents of at least 50%, at least 70%, at least 75%, at least 80%, at least 85%, or at least 90% on a dry basis. In particular embodiments, the protein materials comprise from about 70% to about 95% by weight, from about 75% to about 90% by weight, or from about 80 to 85% by weight protein, on a dry basis. The balance of the protein material may comprise fats, fiber, and/or starch. In certain embodiments, the food additive is distinguishable from flours or other predominantly starch-based compositions. In particular embodiments, the food additive comprises less than 30%, less than 20%, or less than 10% by weight starch, on a dry basis.

In certain embodiments, the L-cysteine, or derivative thereof such as L-cysteine hydrochloride monohydrate, is added to the protein material in the slurry at a level of from about 0.001% to about 3.3%, from about 0.01% to about 2.5%, from about 0.05% to about 1.5%, from about 0.075% to about 1%, or from about 0.1% to about 0.75% by weight, based on the amount of protein solids present in the slurry. The L-cysteine, or derivative thereof, may be plant or animal-derived. An exemplary L-cysteine hydrochloride monohydrate that may be used in the present invention is a plant-based material obtained from Wacker Chemie AG (Munich, Germany) containing 68.99% pure L-cysteine.

The acidity or alkalinity of the slurry can be adjusted using mineral/organic acids or alkaline hydroxides, respectively. In certain embodiments, the organic or mineral acid is selected from the group consisting of hydrochloric acid, sulfuric acid, acetic acid, lactic acid, malic acid, citric acid, succinic acid, fumaric acid, and combinations thereof. In certain embodiments, the alkaline pH adjusting agent is selected from the group consisting of ammonium hydroxide, sodium hydroxide, potassium hydroxide, calcium hydroxide, magnesium hydroxide, and combinations thereof. The pH of the slurry can be adjusted prior to or subsequent to addition of the protein material(s) and L-cysteine. Accordingly, the food additives produced according to the present invention may comprise residues of the organic or mineral acid or alkaline pH adjusting agent.

In certain embodiments, protein glutaminase (e.g., available from Amano Enzyme USA Co. Ltd., Elgin, IL) can be used to deamidate the protein (i.e., convert glutamine residues to glutamate residues. Therefore, in particular embodiments the glutaminase can be added to the slurry, following addition of the L-cysteine, and preferably, post-reaction between the protein materials and L-cysteine, at a level of from about 0.001% to about 5%, 0.01% to about 2.5%, from about 0.05% to about 1.5%, from about 0.1% to about 1%, or from about 0.25% to about 0.75% by weight, based on the amount of protein solids present in the slurry. The protein glutaminase is preferably deactivated via heat treatment prior to final drying of the slurry into a powder form. In yet another example, transglutaminase (e.g., available from Ajinomoto North America, Itasca, IL) can be used to form covalent bonds between amino acid residues lysine and glutamine of the proteins. Prior to final drying, the slurry is heated to deactivate transglutaminase.

In certain embodiments of the present invention, the food additive exhibits at least one improved functional characteristic relative to an otherwise identical food additive comprising at least one protein material that has not been reacted with the L-cysteine, or derivative thereof. The at least one improved functional characteristic is selected from the group consisting of emulsification capacity, oil holding capacity, water holding capacity, whipping properties, extensibility, reduced dough mixing time during bread making, emulsifier replacement ability, and improved loaf volume in bread making.

In certain embodiments, the food additive may be prepared by first forming an aqueous slurry comprising the at least one protein material. In particular embodiments, the slurry comprises from about 10% to about 90%, from about 20% to about 80%, from about 30% to about 70%, or about 40% to about 60% by weight of the at least one protein material. In certain embodiments, the aqueous slurry is optionally homogenized prior to the addition of further materials. This optional homogenization step may occur under acidic, alkaline, or neutral pH conditions. The isoelectric point (pH of minimum solubility) for wheat gluten proteins is around neutral pH or pH 6.5. Thus, the gluten proteins are generally more soluble at acidic pH (pH 4 or lower) and at alkaline pH (pH 10 or higher). Thus, in preferred embodiments homogenization is best accomplished at acidic or alkaline pH. In the absence of any additives and under neutral conditions, homogenization is still possible, but may be less effective due to the poor solubility of wheat gluten proteins. If the homogenization occurs under acidic conditions, a mineral or organic acid is added to the slurry in an amount sufficient to adjust the pH of the slurry to a level of from about 2.0 to about 5.0, from about 3.0 to about 4.5, or from about 3.8 to about 4.2. If the homogenization occurs under alkaline conditions, an alkaline pH adjusting agent is added to the slurry in an amount sufficient to adjust the pH of the slurry to a level of from about 8.0 to about 13.0, from about 9.0 to about 12.0, or from about 10.0 to about 11.5.

The L-cysteine, or a derivative thereof, is then added to the slurry, followed by homogenization of the slurry. In certain embodiments, the homogenization is carried out by using a Morehouse Cowles Mixer, for a period of time of from about 10 minutes to about 90 minutes, from about 15 to about 75 minutes, or from about 20 to about 50 minutes. The homogenized slurry containing the L-cysteine, or derivative thereof, is then heated to a temperature of from about 120° F. to about 212° F., or from about 130° F. to about 200° F., or from about 140° F. to about 190° F. so as to reduce disulfide bonds within the protein material. The heating step may be conducted for a period of time of from about 5 minutes to about 90 minutes, or from about 10 to about 75 minutes, or from about 15 to about 50 minutes.

In certain embodiments, the reacted slurry may be dried to form a powder food additive composition. Drying of the slurry may be carried out by spray drying, flash drying, vacuum drying, or freeze drying.

The food additive may be utilized in the formulation of any number of food products, such as flour-based doughs, which can be baked or fried to yield a wide variety of end products, especially breads and other baked goods. In certain embodiments, the food product comprises from about 0.1 to about 15.0%, from about 1.0 to about 10.0%, or from about 3.0% to about 7.0% by weight of the food additive.

EXAMPLES

The following examples set forth various methods employed for producing homogenized and L-cysteine-treated protein products. It is to be understood, however, that these examples are provided by way of illustration and nothing therein should be taken as a limitation upon the overall scope of the invention.

Example 1

20 lbs of water (110° F.) was added to a small dispersion tank. A homomixer unit (Morehouse-Cowles) was turned on and 73.5 g of malic acid was added. The mixture was homogenized for 5 minutes. (The level of malic acid is 2.7% based on gluten solids. Other levels of malic acid ranging from 0.5-15.0% can be used.) 20 lbs of high-protein wet gluten dough was slowly added. The gluten dough was obtained fresh from a gluten and starch plant and contained about 30% solids and about 90% protein, N×6.25, dry basis. It is noted that a regular wet gluten dough with about 30% solids and about 75% protein, N×5.7, dry basis can also be used as the gluten source. Following addition of all of the gluten dough, the mixture was homogenized for 5 minutes. 6.81 grams of L-cysteine hydrochloride monohydrate was added to the homogenized dough mixture. This level of L-cysteine hydrochloride monohydrate is 0.25% based on gluten solids. The range can be from 0.001-3.3% L-cysteine hydrochloride monohydrate. It is to be understood that 0.25% L-cysteine hydrochloride monohydrate is equivalent to 0.17% pure L-cysteine and 0.001-3.3% L-cysteine hydrochloride monohydrate is equivalent to 0.00069-2.3% pure L-cysteine. The resulting slurry was homogenized for 30 minutes and then heated to 145° F. for 5 minutes. The slurry was then dried in a pilot Niro spray dryer. The dry L-cysteine-treated product (pH=3.7) was collected.

Example 2

In this example, the procedure of Example 1 was repeated, except the dry L-cysteine-treated protein product was adjusted to pH 6.5 using trisodium phosphate powder.

Example 3

In this example, 18 lbs of water (110° F.) was added to a small dispersion tank. The homomixer unit (Morehouse-Cowles) was turned on. 80 g of malic acid was added and the mixture was homogenized for 5 minutes. The level of malic acid is 3.9% based on protein solids. 1.35 lbs of pea protein isolate was added and the mixture homogenized for 5 minutes. 10.5 lbs of regular wet gluten dough (obtained fresh from a gluten and starch plant; containing about 30% solids and about 75% protein, N×5.7, dry basis) was added slowly. The high-protein wet gluten dough as described in Example 1 can also be used as the gluten source. The slurry was homogenized for 5 minutes. 5.1 g of L-cysteine hydrochloride monohydrate was added. This amounts to 0.25% L-cysteine hydrochloride monohydrate based on protein solids and is equivalent to 0.17% pure L-cysteine based on protein solids. The mixture was then homogenized for 30 minutes. The slurry was heated to 150° F. for 5 minutes. The slurry was then dried in a pilot Niro spray dryer. The dry L-cysteine-treated protein product was collected.

Example 4

In this example, 18 lbs of water (110° F.) were placed in a small dispersion tank. The homomixer unit (Morehouse-Cowles) was started. 1.35 lbs of lentil protein was added and the mixture homogenized for 5 minutes. 10.5 lbs of regular wet gluten dough (obtained fresh from a gluten and starch plant; containing about 30% solids and about 75% protein, N×5.7, dry basis) was added slowly. The high-protein wet gluten dough as described in Example 1 can also be used as the gluten source. The slurry was homogenized for 10 minutes. 5.1 g of L-cysteine hydrochloride monohydrate was added. This amounts to 0.25% L-cysteine hydrochloride monohydrate based on protein solids and is equivalent to 0.17% pure L-cysteine based on protein solids. The mixture was then homogenized for 30 minutes. The slurry was heated to 150° F. for 5 minutes. The slurry was then dried in a pilot Niro spray dryer. The dry L-cysteine-treated protein product was collected.

Example 5

In this example, 18 lbs of water (110° F.) were placed in a small dispersion tank. The homomixer unit (Morehouse-Cowles) was started. 1.35 lbs of lentil protein was added and the mixture homogenized for 5 minutes. 10.5 lbs of regular wet gluten dough (obtained fresh from a gluten and starch plant; containing about 30% solids and about 75% protein, N×5.7, dry basis) was added slowly. The high-protein wet gluten dough as described in Example 1 can also be used as the gluten source. The slurry was homogenized for 10 minutes. 5.1 g of L-cysteine hydrochloride monohydrate was added. This amounts to 0.25% L-cysteine hydrochloride monohydrate based on protein solids and is equivalent to 0.17% pure L-cysteine based on protein solids. The mixture was then homogenized for 30 minutes. After 30 minutes, 10.22 g of protein glutaminase (0.5% based on protein solids) was added and the mixture homogenized for 60 minutes. The slurry was heated to 185° F. for 5 minutes to deactivate the enzyme. The slurry was then dried in a pilot Niro spray dryer. The dry L-cysteine-treated protein product was collected.

Example 6

In this example, the same procedure was employed as described in Example 4, except that 0.9 lbs of lentil protein and 12 lbs of regular wet gluten dough were used.

Example 7

In this example, 18 lbs of water (110° F.) were placed in a small dispersion tank. The homomixer unit (Morehouse-Cowles) was started. 1.35 lbs of lentil protein was added and the mixture homogenized for 5 minutes. 10.5 lbs of high-protein wet gluten dough (obtained fresh from a gluten and starch plant; containing about 30% solids and about 90% protein, N×6.25, dry basis) was added slowly. 5.1 g of L-cysteine hydrochloride monohydrate was added. This amounts to 0.25% L-cysteine hydrochloride monohydrate based on protein solids and is equivalent to 0.17% pure L-cysteine based on protein solids. The mixture was then homogenized for 30 minutes. The slurry was heated to 150° F. for 5 minutes. The slurry was then dried in a pilot Niro spray dryer. The dry L-cysteine-treated protein product was collected.

Example 8

In this example, 18 lbs of water (110° F.) were placed in a small dispersion tank. The homomixer unit (Morehouse-Cowles) was started. 1.6 lbs of ProPulse pea protein isolate and 1.6 lbs of lentil protein were added and the mixture homogenized for 10 minutes. 3.6 g of L-cysteine hydrochloride monohydrate was added. This amounts to 0.25% L-cysteine hydrochloride monohydrate based on protein solids and is equivalent to 0.17% pure L-cysteine based on protein solids. The mixture was homogenized for 30 minutes. The slurry was heated to 150° F. for 5 minutes. The slurry was then dried in a pilot Niro spray dryer. The dry L-cysteine-treated protein product was collected.

Example 9

In this example, 18 lbs of water (110° F.) were placed in a small dispersion tank. The homomixer unit (Morehouse-Cowles) was started. 1.6 lbs of ProPulse pea protein isolate and 1.6 lbs of lentil protein were added and the mixture homogenized for 10 minutes. 3.6 g of L-cysteine hydrochloride monohydrate was added. This amounts to 0.25% L-cysteine hydrochloride monohydrate based on protein solids and is equivalent to 0.17% pure L-cysteine based on protein solids. The mixture was homogenized for 30 minutes. After 30 minutes, 7.2 g of protein glutaminase (0.5% based on protein solids) was added and the mixture homogenized for 60 minutes. The slurry was heated to 185° F. for 5 minutes to deactivate the enzyme. The slurry was then dried in a pilot Niro spray dryer. The dry L-cysteine-treated protein product was collected.

Example 10

In this example, 20 lbs of water (110° F.) was placed in a small dispersion tank. The homomixer unit (Morehouse-Cowles) was started. 73.5 g of citric acid was added and the mixture was homogenized for 5 minutes. 20 lbs of high-protein wet gluten dough (obtained fresh from a gluten and starch plant; contains about 30% solids and about 90% protein, N×6.25, dry basis) was added slowly. A regular wet gluten dough with around 30% solids and around 75% protein, N×5.7, dry basis can also be used as the gluten source. After all the gluten dough had been added, the mixture was homogenized for 30 minutes. 0.463 grams of L-cysteine hydrochloride monohydrate was added. This level of L-cysteine hydrochloride monohydrate is 0.017% based on gluten solids. The range can be 0.001-3.3% L-cysteine hydrochloride monohydrate. It is to be understood that 0.017% L-cysteine hydrochloride monohydrate is equivalent to 0.0117% pure L-cysteine and 0.001-3.3% L-cysteine hydrochloride monohydrate is equivalent to 0.00069-2.3% pure L-cysteine. The slurry was homogenized for 30 minutes. The slurry was heated to 145° F. for 5 minutes. The slurry was then dried in a pilot Niro spray dryer. The dry L-cysteine-treated protein product was collected.

Example 11

In this example, the same conditions as in Example 10 were used, except 0.926 grams of L-cysteine hydrochloride monohydrate (0.034% based on protein solids) was added.

Example 12

In this example, the same conditions described in Example 1 were scaled-up in a gluten and starch plant to produce larger quantities of L-cysteine-treated high-protein wheat gluten. A total of 349×30-pound bags (10,470 lbs) of L-cysteine-treated high-protein wheat gluten was successfully produced.

Example 13

In this example, portions of the L-cysteine-treated protein product from Example 12 was adjusted to pH 6.5 using trisodium phosphate powder.

Example 14

In this example, 19 lbs of water (100-110° F.) was placed in a small dispersion tank. The homomixer unit (Morehouse-Coles) was started. 790 grams of ammonium hydroxide (50% v/v) aqueous solution, Ricca Chemical Company, Arlington, TX, was added to the dispersion tank. Other alkaline pH adjusting agents such as calcium hydroxide, potassium hydroxide and sodium hydroxide may also be used. 18 lbs of regular wet gluten dough (obtained fresh from a gluten and starch plant; containing about 30% solids and about 75% protein, N×5.7, dry basis) was added slowly. A high-protein wet gluten dough with around 30% solids and about 90% protein, N×6.25, dry basis can also be used as the gluten source. After all the gluten dough had been added, the mixture was homogenized for 5 minutes. 6.13 grams of L-cysteine hydrochloride monohydrate was added. This level of L-cysteine hydrochloride monohydrate is 0.25% based on gluten solids. The range can be 0.001-3.3% L-cysteine hydrochloride monohydrate. It is to be understood that 0.25% L-cysteine hydrochloride monohydrate is equivalent to 0.17% pure L-cysteine and 0.001-3.3% L-cysteine hydrochloride monohydrate is equivalent to 0.00069-2.3% pure L-cysteine. The slurry was homogenized for 30 minutes. The pH at this point was about 10.20. The slurry was then dried in a pilot Niro spray dryer. The dry L-cysteine-treated protein product was collected.

Example 15

In this example, 19 lbs of water (100-110° F.) was placed in a small dispersion tank. The homomixer unit (Morehouse-Coles) was started. 1.35 lbs of ProPulse pea protein isolate was added to the dispersion tank. The pH of the slurry was adjusted to around 10 using 800 grams of ammonium hydroxide (50%0 v/v) aqueous solution, Ricca Chemical Company, Arlington, TX, and the slurry mixed for 5 minutes. Other alkaline pH adjusting agents such as calcium hydroxide, potassium hydroxide and sodium hydroxide may also be used. 10.5 lbs of regular wet gluten dough (obtained fresh from a gluten and starch plant; contains about 30% solids and about 75% protein, N×5.7, dry basis) was added slowly. A high-protein wet gluten dough with around 30% solids and about 90% protein, N×6.25, dry basis can also be used as the gluten source. After all the gluten dough had been added, the mixture was homogenized for 5 minutes. 5.11 grams of L-cysteine hydrochloride monohydrate was added. This level of L-cysteine hydrochloride monohydrate is 0.25% based on gluten solids. The range can be 0.001-3.3% L-cysteine hydrochloride monohydrate. It is to be understood that 0.25% L-cysteine hydrochloride monohydrate is equivalent to 0.17% pure L-cysteine and 0.001-3.3% L-cysteine hydrochloride monohydrate is equivalent to 0.00069-2.3% pure L-cysteine. The slurry was homogenized for 30 minutes. The pH at this point was about 10.25. The slurry was then dried in a pilot Niro spray dryer. The dry L-cysteine-treated protein product was collected.

Example 16

The procedure of Example 15 was repeated except that ProPulse pea protein isolate was replaced either by lentil protein, pea protein concentrate, potato protein, PurisPea pea protein isolate, sunflower protein, pumpkin protein, Nutralys pea protein isolate or faba bean protein. The pH of the slurry prior to spray drying ranged from 10.28-10.59.

Example 17

The procedure of Example 15 was repeated except that 1.35 lbs of ProPulse pea protein isolate was replaced either by a blend of a) 0.45 lbs lentil protein and 0.9 lbs pea protein concentrate, b) 0.9 lbs lentil protein and 0.45 lbs pea protein concentrate, or c) 0.9 lbs lentil protein and 0.45 lbs ProPulse pea protein isolate. The pH of the slurry prior to spray drying ranged from 10.29-10.47.

Example 18

In this example, 25.5 lbs of water (100-110° F.) was placed in a small dispersion tank. The homomixer unit (Morehouse-Coles) was started. 2.25 lbs of ProPulse pea protein isolate was added to the dispersion tank followed by 2.25 lbs of lentil protein. The pH of the slurry was adjusted to around 10 using 790 grams of ammonium hydroxide (50% v/v) aqueous solution, Ricca Chemical Company, Arlington, TX, and the slurry mixed for 5 minutes. Other alkaline pH adjusting agents such as calcium hydroxide, potassium hydroxide and sodium hydroxide may also be used. 5.11 grams of L-cysteine hydrochloride monohydrate was added. This level of L-cysteine hydrochloride monohydrate is 0.25% based on gluten solids. The range can be 0.001-3.3% L-cysteine hydrochloride monohydrate. It is to be understood that 0.25% L-cysteine hydrochloride monohydrate is equivalent to 0.17% pure L-cysteine and 0.001-3.3% L-cysteine hydrochloride monohydrate is equivalent to 0.00069-2.3% pure L-cysteine. The slurry was homogenized for 30 minutes. The pH at this point was about 10.42. The slurry was then dried in a pilot Niro spray dryer. The dry L-cysteine-treated protein product was collected.

Example 19

The procedure of Example 18 was repeated except that lentil protein was replaced by potato protein. The pH of the slurry prior to spray drying was about 10.53.

Materials

The plant-based protein sources used in this example comprise regular wet gluten dough (around 30% solids and 75% protein, N×5.7, dry basis) and high-protein wet gluten dough (around 30% solids and 90% protein, N×6.25, dry basis) obtained fresh from a gluten and starch manufacturing plant. Other protein sources include regular wheat gluten (also called vital wheat gluten) (around 75% protein, N×5.7, dry basis; pH=6.5), Arise® 8000 (a high-protein wheat gluten (also called wheat protein isolate) with around 90% protein, N×6.25, dry basis; pH=6.4), Arise® 5000 (around 90% protein, N×6.25, dry basis; pH=4.5; Ingredient declaration: wheat protein isolate (wheat gluten, lactic acid, sulfite)), Prolite® 100 (around 90% protein, N×6.25, dry basis; pH=4.5; Ingredient declaration: wheat protein isolate (wheat gluten, lactic acid, sulfite)) and Arise® 6000 (around 85% protein, N×6.25, dry basis; pH=6.6; Ingredient declaration: wheat protein isolate (wheat gluten, phosphate, lactic acid, sulfite)). Prolite® 100 was obtained from ADM Company (Decatur, IL) and all the other abovementioned proteins are from MGP Ingredients, Inc. (Atchison, KS). Sulfite-treated proteins are described in U.S. Pat. No. 8,309, 152 (Maningat et al 2012).

Pea protein isolate (ProPulse from Nutri-Pea Ltd., Manitoba, Canada; 76% protein; pH=7.5) was obtained from MGB Ingredients (St. Joseph, MO) and lentil protein (VITESSENCE™ Pulse 2550 Protein; 51% protein; pH=6.6) was from Ingredion Inc. (Westchester, IL). Other plant-based protein samples include: pea protein concentrate (VITESSENCE™ Pulse 1550 and CT 1552; 51% protein; pH=6.76) from Ingredion Inc. (Westchester, IL); faba bean protein (VITESSENCE™ Pulse 3600; 56% protein; pH=6.6) from Ingredion Inc. (Westchester, IL); pea protein isolate (Nutralys F85F; 86% protein; pH=7.55) from Roquette (France); pea protein isolate (PurisPea 870; 80% protein; pH=7.28) from World Food Processing LLC (Turtle Lake, WI); potato protein isolate (Solanic 100N; 80% protein; pH=7.29) from Avebe (Netherlands); sunflower protein (Heliaflor 55; 55% protein; pH=6.84) from Austrade Inc. (Palm Beach Gardens, FL); and pumpkin protein (60% protein; pH=6.74) from Austrade Inc. (Palm Beach Gardens, FL). The above protein values are as reported by the manufacturers. Samples of soy protein isolate, whey protein isolate and sodium caseinate were also obtained from suppliers/manufacturers.

Malic acid, citric acid, trisodium phosphate and ammonium hydroxide are chemical grade. Diacetyl tartaric acid ester of mono- and diglycerides (DATEM) and sodium stearoyl lactylate (SSL) were food- or bakery-grade quality.

Protein Glutaminase (Amano Enzyme USA Co. Ltd., Elgin, IL) was used to deamidate the protein (i.e. convert glutamine residues to glutamate residues). Ajinomoto North America (Itasca, IL) provided a sample of transglutaminase (Activa®). Transglutaminase is an enzyme that catalyzes the formation of covalent bonds between the amino acid residues lysine and glutamine in proteins.

L-cysteine hydrochloride monohydrate derived from a vegetarian source was obtained from Wacker Chemie AG (Munchen, Germany). It was used as a reducing agent to break disulfide bonds in proteins. L-cysteine hydrochloride monohydrate contains 68.99% pure L-cysteine. It is to be understood in this invention that L-cysteine hydrochloride monohydrate was used in the process and the level of usage equates to 68.99% of pure L-cysteine. For example, if 0.25% L-cysteine hydrochloride monohydrate based on protein solids was used, that amount is equivalent to 0.17% pure L-cysteine based on protein solids.

Methods

The pH of the starting protein materials, dry blended protein products, and L-cysteine-treated protein products was measured by dispersing 10 g sample in 90 ml distilled water.

Mixograph Procedure

A 10-gram Mixograph instrument (National Manufacturing Company, Lincoln, Nebraska) was used to study the mixing properties of flour, flour with added proteins, untreated wheat proteins, commercially-available wheat protein isolates, and L-cysteine-treated proteins or protein mixtures.

Control wheat flour was weighed (10 g, as is basis) and placed in the Mixograph bowl. Water at 62% absorption (6.2 g) was added and the Mixograph instrument was turned on to mix the dough for 10 minutes.

Proteins were added to wheat flour at 1, 3 or 5% level of flour replacement. After thoroughly mixing the 10-gram blend, 6.2 g water was added plus 1.5 g extra water for every 1 g protein added. Then, the Mixograph instrument was started.

In the case of L-cysteine-treated proteins with acidic pH, 5 g was weighed and to it was added 5 g of wheat starch followed by blending the mixture. Water was added (5 g) and the Mixograph instrument was started. Commercial samples like Arise® 5000 and Prolite® 100 used the above-mentioned conditions.

L-cysteine-treated proteins with neutral pH (around pH 6.5) was evaluated in the Mixograph as above except that the amount of water was 6.7 g. Similar conditions were used for the commercial sample of Arise® 6000 and for ammonia-dispersed L-cysteine treated proteins that possess neutral pH after spray drying.

The Mixograph conditions for commercial regular wheat gluten or vital wheat gluten and Arise® 8000 used 2.9 g of sample, 7.1 g of wheat starch and 8.6 g of water.

The curve generated from the Mixograph is a plot of mixing strength (y-axis from 0-100 Mixograph Units (MU)) versus time (x-axis from 0-10 minutes). The instrument measures and records the resistance of dough to mixing. The mixing curve indicates optimum development or mixing time. It has been used to study the effects of added ingredients on dough mixing properties. The peak of the curve is a measure of dough mixing strength and the time where the peak occurs is a measure of optimum mixing time.

Bake Test to Evaluate the Effect on Dough Mix Time and Loaf Volume of L-Cysteine-Treated High-Protein Wheat Gluten and Protein Mixtures at 1.5% Level of Addition (Based on Flour)

Bread was baked as pup loaves using AACC International Method 10-10.03 straight dough procedure with 90 min fermentation. The formula contained commercial bread flour (100 g, 14% mb), water (73 ml) shortening (3 g), instant active dry yeast (2 g), sugar (6 g) and salt (1.5 g). Wheat protein samples were added at 1.5° 0% fwb on top of the flour. The controls contained no added wheat protein. Optimum water absorption for the control was 70% fwb. Absorption was increased by 3% (2% per added protein %) to 73% fwb for doughs containing the wheat protein samples. Mix time was optimized for each treatment. Dough handling characteristics were rated as weak, ok, good or strong at first punch. Loaf volume was taken immediately after baking by rapeseed displacement (AACC International Method 54-05.01). Loaves were cut vertically 50 mm from the end and the crumb grain characteristics were evaluated subjectively by an experienced test baker as poor, ok, good or excellent. All treatments were baked in duplicate.

Layer Cake Bake Test to Evaluate the Effect on Cake Volume (Height) of L-Cysteine-Treated Protein Compositions at 1.5% Replacement Level of Cake Flour The control layer cake formula consists of sugar (29%), shortening (10%), dry whole eggs (3%), water (29.4%), flavor (1%), cake flour (25.1%), salt (0.5%), baking powder (1%) and nonfat dry milk (15). The test sample contains L-cysteine-treated protein composition (1.5%), water (30.9%), cake flour (23.6%), and all other ingredients remaining the same as the control cake. Cake baking consists of the following steps.

1. Sift sugar and nonfat dry milk separately.
2. Blend cake flour, emulsifier, salt, baking powder and nonfat dry milk together and sift.
3. Mix shortening and gradually add sugar in a KitchenAid mixer for 1 min.
4. Add dry eggs and vanilla to sugar mixture and stir for 20 seconds (low setting)
5. Add dry mix and water alternately to the sugar blend
6. Stir at medium-low speed for 1 min
7. Weigh 400 grams of batter into greased 8-inch round pan
8. Bake at 350° F. for 30 min.
9. Measure height of the cake in mm Oil Holding Capacity (OHC)

OHC is defined as the amount of oil that can be absorbed by one gram of protein, and was tested according to the Modification of Protein Functionality Testing Manual (Nickerson 2012). 1 g of protein (based on a wet basis) is wetted with 10 mL of vegetable oil in a weighted 50 mL centrifuge tube and mixed thoroughly. The sample was vortexed every 5 min for a total of 30 min. The sample was centrifuged at 1,000×g (about 3000 rpm) for 15 min. The supernatant was decanted and the remaining sediment weighed. OHC is calculated by:

$$OHC = \frac{\text{Wet sample } wt. - \text{Dry sample } wt.}{\text{Dry sample } wt.}$$

Water Holding Capacity (WHC)

WHC is defined as the amount of water that can be absorbed by one gram of protein, and was tested according to the Modification of Protein Functionality Testing Manual (Nickerson 2012). 1 g of protein (based on a wet basis) was wetted with 10 mL of water in a weighted 50 mL centrifuge tube and mix thoroughly. The sample was vortexed every 5 min for a total of 30 min. The sample was centrifuged at 1,000×g (about 3000 rpm) for 15 min. The supernatant was decanted and the remaining sediment weighed. WHC is calculated by:

$$WHC = \frac{\text{Wet sample } wt. - \text{Dry sample } wt.}{\text{Dry sample } wt.}$$

Emulsifying Activity Index (EAI) and Emulsifying Stability Index (ESI)

EAI is defined as the ability of a protein to form an emulsion; with the index providing an estimate of the interfacial area stabilized per unit weight of protein based on the turbidity of a diluted emulsion. ESI is the measure of the stability of the same diluted emulsion over a defined time period. Both EAI and ESI were determined according to the Modification of Protein Functionality Testing Manual (Nickerson 2012).

A 0.1% SDS solution was prepared with 100 ml water and 0.1 g SDS. In a 250 ml beaker, 75 ml of faucet water was added along with 0.19 g protein sample (based on sample weight) to achieve an approximately 0.25% protein solution. 75 g of vegetable oil was added to 75 g of the protein solution and the mixture was homogenized at 6,000 rpm for 5 min. 50 µL of the emulsion and 7.5 mL of the SDS solution were mixed and vortexed for 10 s. An aliquot of this suspension is taken at time 0 and 10 min, and the absorbance of the diluted emulsion is measured at 500 nm using a UV spectrophotometer using plastic cuvettes. EAI and ESI are calculated by using the following equations:

$$EAI\left(\frac{m^2}{g}\right) = \frac{2 * 2.303 * A_o * N}{c * \varphi * 10000}$$

$$ESI(\min) = \frac{A_o}{\Delta A} * t$$

where, 2.303 represents the turbidity, $A_o$ is the absorbance of the diluted emulsion post-homogenization, N is the dilution factor (×150), c is the weight of protein per volume (g/mL) of the protein aqueous phase before emulsion formation, p is the oil volume fraction of the emulsion (v/v), $\Delta A$ is the change in absorbance between 0 and 10 min ($A_0$-$A_{10}$) and t is the time interval, 10 min.

Emulsifying Capacity (EC)

EC is defined as the amount of oil that can be emulsified by a standard amount of protein under a specific set of conditions. EC was determined using a modification of method by Gutkowski (2016) and the Protein Functionality Testing Manual (Nickerson 2012).

4 g of the protein sample and 250 ml of tap water were stirred in a 400 ml beaker for 25 minutes. The mixture was homogenized at 3000 rpm for 3 minutes while adding ½ ml of vegetable oil. The speed of the homogenizer was raised to 4000 rpm and 2 ml of oil is mixed in. The mixture is mixed for 3 minutes. The sample was checked for oil droplets on the surface. If droplets on the surfaces were present, the sample was deemed unstable. The mixture was then homogenized at 5000 rpm while slowly adding oil and the mixture is checked frequently for signs of instability. Emulsifying Capacity (EC) is calculated by:

$$EC = \frac{\text{Amount of oil successfully emulsified (g)}}{\text{Set original amount of protein (g)}}$$

Whipping Properties

Twenty grams of a protein sample were placed in the bowl of a KitchenAid Mixer (Model: Classic) containing 200 ml of water. The wire whip attachment was installed and the mixer was turned on at speed 2 for 1 minute to fully disperse and hydrate the protein. Then, the mixer was adjusted to speed 6 and allowed to whip the slurry for 2 minutes. Finally, the slurry was whipped for 2 minutes at speed 8. A photograph was taken of the foam that developed for relative comparison of foam volume and thickness among the protein samples and it was noted whether water separation occurred or not 5 minutes after the whipping step.

Bake Test to Evaluate the Replacement in a Bread Formula of Emulsifiers (DATEM and SSL) with L-Cysteine-Treated Proteins and Protein Mixtures Commercial bread flour was used. Bread was baked as pup loaves using AACC International Method 10-10.03 straight dough procedure with 90 min fermentation. The formula contained bread flour (100 g, 14% mb), water (73 ml) shortening (3 g), instant active dry yeast (2 g), sugar (6 g) and salt (1.5 g). Wheat protein samples were added at 0.5% fwb on top of the flour. The controls contained 0.5% SSL or 0.5% DATEM. Mix time was 4 min. Dough handling characteristics were rated as weak, ok, good or strong at first punch. Loaf volume was taken immediately after baking by rapeseed displacement (AACC International Method 54-05.01). Loaves were cut vertically 50 mm from the end and the crumb grain characteristics were evaluated subjectively by an experienced test baker as poor, ok, good or excellent. All treatments were baked in duplicate. Data were analyzed using JMP with the Tukey Test at p=0.05.

Bread Bake Test to Replace 50% of SSL (1%) Using L-Cysteine-Treated Protein Mixtures The Pup Loaf Test Baking Procedure: AACC 10-10.03 was followed with a modified baking temperature of 390° F. for 24 min. The bread formula (baker's percent) consists of bread flour (100%), yeast (5.0%), shortening (5.0%), salt (2.0%), sugar (4.0%), water (variable), ascorbic acid (75 ppm) and sodium stearoyl lactylate (1.0%).

Results

The sample identification of L-cysteine-treated protein compositions prepared in accordance with the present invention are presented in Tables 1 and 2. The information contains the protein source, protein ratio, acid concentration, alkali concentration, enzyme use, level of L-cysteine hydrochloride monohydrate, and pH of the dry protein composition.

TABLE 1

Identity of samples of neutral-dispersed or acid-dispersed, L-cysteine-treated protein composition

| Sample ID | Protein Source | Protein Source | Malic Acid | Enzymes | L-Cysteine Hydrochloride Monohydrate | pH of Dry Protein Composition |
| --- | --- | --- | --- | --- | --- | --- |
| Sample A | 100% High-Protein Wheat Gluten | — | 2.0% | — | 0.25% | 4.9 |
| Sample B | 100% High-Protein Wheat Gluten | — | 2.0% | — | 0.35% | 5.0 |
| Sample C | 100% High-Protein Wheat Gluten | — | 2.7% | — | 0.25% | 4.5 |
| Sample D | 70% Regular Wheat Gluten | 30% Pea Protein Isolate (ProPulse) | 3.9% | — | 0.25% | 4.0 |
| Sample E | 100% High-Protein Wheat Gluten | — | 2.7% | — | 0.10% | 4.4 |
| Sample F | 100% High-Protein Wheat Gluten | — | 2.0% | — | 0.25% | 3.7 |
| Sample G | 100% High-Protein Wheat Gluten | — | 2.0% | — | 0.25% | 6.5 |
| Sample H (Plant-Produced) | 100% High-Protein Wheat Gluten | — | 2.7% | — | 0.25% | 3.7 |
| Sample I (Plant-Produced) | 100% High-Protein Wheat Gluten | — | 2.7% | — | 0.25% | 6.5 |
| Sample J | 100% High-Protein Wheat Gluten | — | 2.0% | — | 0.30% | 5.0 |
| Sample K (Dry Blend) | 70% Arise 8000 | 30% Lentil Protein | — | — | — | 6.4 |
| Sample L | 70% High-Protein Wheat Gluten | 30% Lentil Protein | — | — | 0.25% | 5.5 |
| Sample M (Dry-Blend) | 50% Pea Protein Isolate (ProPulse) | 50% Lentil Protein | — | — | — | 7.1 |
| Sample N | 50% Pea Protein isolate (ProPulse) | 50% Lentil Protein | — | — | 0.25% | 6.9 |
| Sample O | 100% High-Protein Wheat Gluten | — | 2.7%* | — | 0.017% | 5.2 |
| Sample P | 100% High-Protein Wheat Gluten | — | 2.7%* | — | 0.034% | 4.8 |
| Sample Q | 100% High-Protein Wheat Gluten | — | 2.7% | — | 0.017% | 4.6 |
| Sample R | 100% High-Protein Wheat Gluten | — | 2.7% | — | 0.034% | 4.6 |
| Sample S | 100% High-Protein Wheat Gluten | — | 2.7% | — | 0.20% | 4.6 |
| Sample T | 100% High-Protein Wheat Gluten | — | 2.7% | — | 0.30% | 4.6 |
| Sample U | 100% High-Protein Wheat Gluten | — | 2.0% | — | 0.275% | 4.8 |
| Sample V | 70% Regular Wheat Gluten | 30% Lentil Protein | — | — | 0.25% | 5.2 |
| Sample W | 70% Regular Wheat Gluten | 30% Lentil Protein | — | 0.5% Protein Glutaminase | 0.25% | 5.7 |
| Sample X | 50% Pea Protein isolate (ProPulse) | 50% Lentil Protein | — | 0.5% Protein Glutaminase | 0.25% | 6.8 |
| Sample Y | 80% Regular Wheat Gluten | 20% Lentil Protein | — | — | 0.25% | 5.1 |
| Sample Z (Dry Blend) | 70% Regular Wheat Gluten | 30% Lentil Protein | — | — | — | 6.4 |
| Sample AA (Dry Blend) | 80% Regular Wheat Gluten | 20% Lentil Protein | — | — | — | 6.2 |

*% citric acid added (contains no malic acid)

TABLE 2

Identity of samples of alkaline-dispersed, L-cysteine-treated protein compositions

| Sample ID | Protein Source | Protein Source | Ammonium Hydroxide* | Enzymes | L-Cysteine Hydrochloride Monohydrate | pH of Dry Protein Composition |
|---|---|---|---|---|---|---|
| 189 | 70% Regular Wheat Gluten | 30% Lentil Protein | 38.7% | — | 0.25% | 7.31 |
| 190 | 70% Regular Wheat Gluten | 30% Pea Protein Concentrate | 38.7% | — | 0.25% | 7.32 |
| 191 | 70% Regular Wheat Gluten | 30% Pea Protein Isolate (ProPulse) | 38.7 | — | 0.25% | 7.30 |
| 192 | 70% Regular Wheat Gluten | 20% Lentil Protein; 10% Pea Protein Concentrate | 38.7 | — | 0.25 | 7.37 |
| 193 | 70% Regular Wheat Gluten | 20% Pea Protein Concentrate; 10% Lentil Protein | 38.7 | — | 0.25% | 7.52 |
| 194 | 70% Regular Wheat Gluten | 20% Lentil Protein; 10% Pea Protein Isolate (ProPulse) | 38.7 | — | 0.25% | 7.40 |
| 196 | 70% Regular Wheat Gluten | 30% Potato Protein | 38.7 | — | 0.25% | 7.06 |
| 197 | 100% Regular Wheat Gluten | — | 38.7 | — | 0.25% | 7.12 |
| 200 | 80% Regular Wheat Gluten | 20% Potato Protein | 38.7 | — | 0.25% | 7.18 |
| 202 | 70% High-Protein Wheat Gluten | 30% Sunflower Protein | 38.7 | — | 0.25 | 7.54 |
| 203 | 70% Regular Wheat Gluten | 30% Pea Protein Isolate (PurisPea) | 38.7% | — | 0.25% | 7.04 |
| 204 | 70% Regular Wheat Gluten | 30% Pumpkin Protein | 38.7% | | 0.25% | 6.89 |
| 206 | 50% Lentil Protein | 50% Pea Protein Isolate (ProPulse) | 38.7% | | 0.25% | 7.62 |
| 207 | 50% Pea Protein Isolate (ProPulse) | 50% Potato Protein | 38.7% | | 0.25% | 7.44 |
| 222 | 70% Regular Wheat Gluten | 30% Faba Bean Protein | 38.7% | | 0.25% | 7.32 |
| 224 | 70% Regular Wheat Gluten | 30% Pea Protein Isolate (Nutralys) | 38.7% | | 0.25% | 7.08 |
| 231 | 70% Regular Wheat Gluten | 30% Lentil Protein | 38.7% | 0.5% Transglutaminase | 0.25% | 7.30 |

*% vol./wt. protein (using 50% NH$_4$OH)

Mixing Characteristics

Figure 2A:
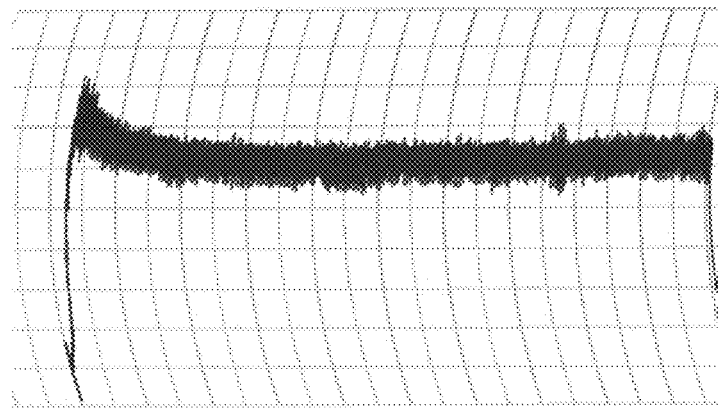
FIGS. 2(*a*)-(*c*) depict mixograph profiles of commercially-available sulfite-treated wheat protein isolates.
Figure 2B:
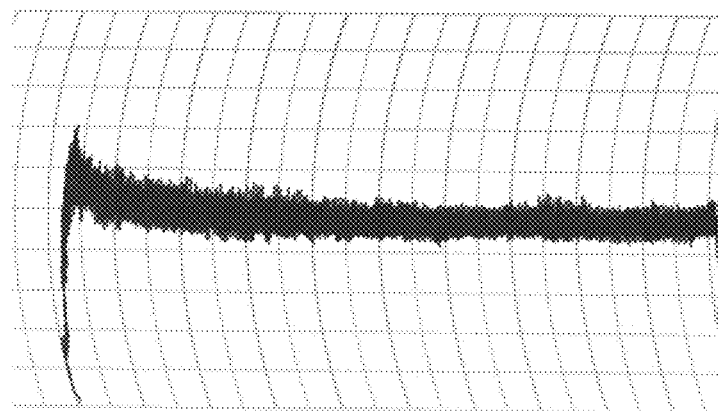
Figure 2C:
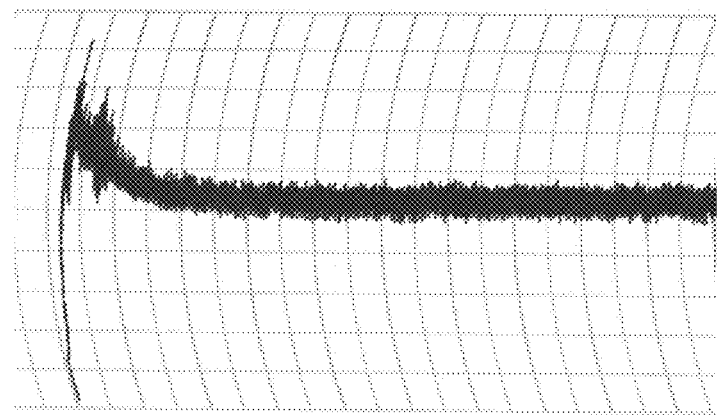

The Mixograph profiles of vital wheat gluten (also called regular wheat gluten) and Arise® 8000 (a wheat protein isolate or a high-protein wheat gluten product) are displayed in FIGS. 1(a) and (b), respectively. Commercially-available sulfite-treated wheat proteins (Arise® 5000, Prolite® 100, and Arise® 6000) exhibited rapid hydration and different mixing characteristics compared to vital wheat gluten and Arise® 8000 as demonstrated in FIGS. 2(a)-(c), respectively.

Figure 1B:
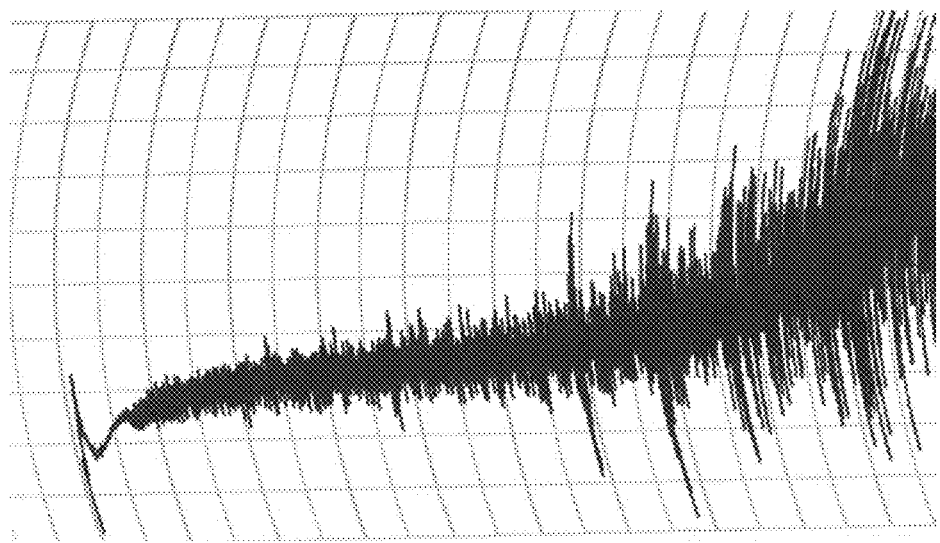
Figure 3A:
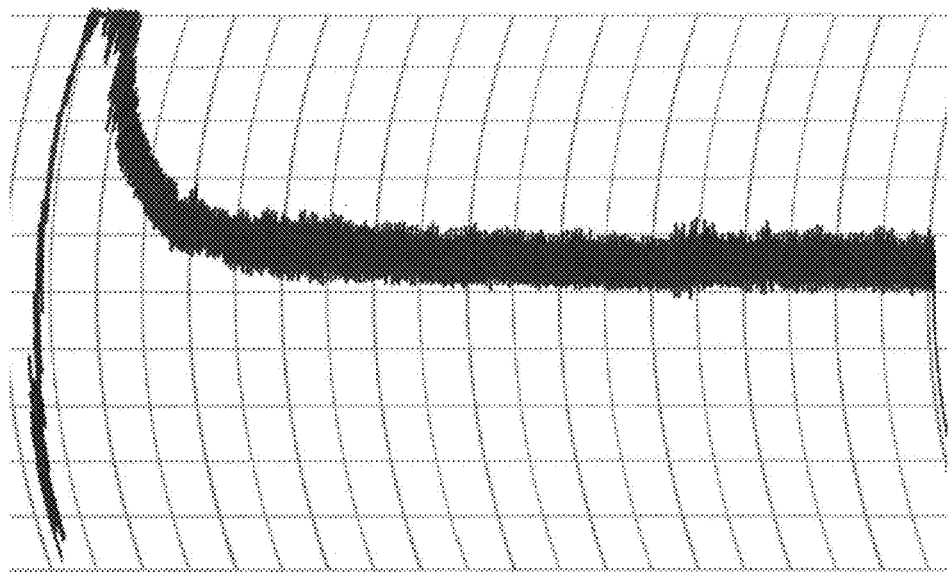
FIGS. 3(*a*)-(*d*) depict mixograph curves showing the effect of protein source and level of malic acid and L-cysteine hydrochloride monohydrate on mixograph profile of L-cysteine-treated protein and protein mixtures.
Figure 3B:
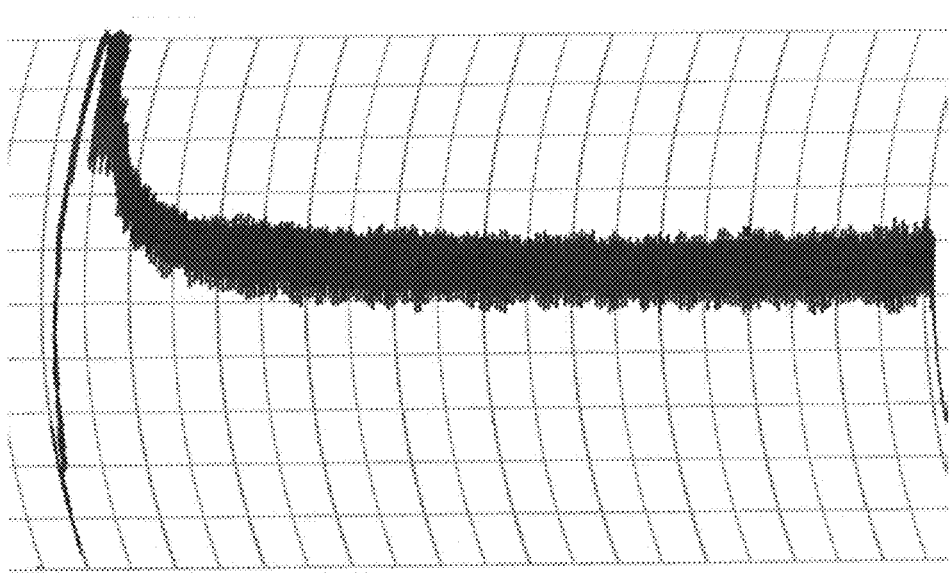
Figure 3C:
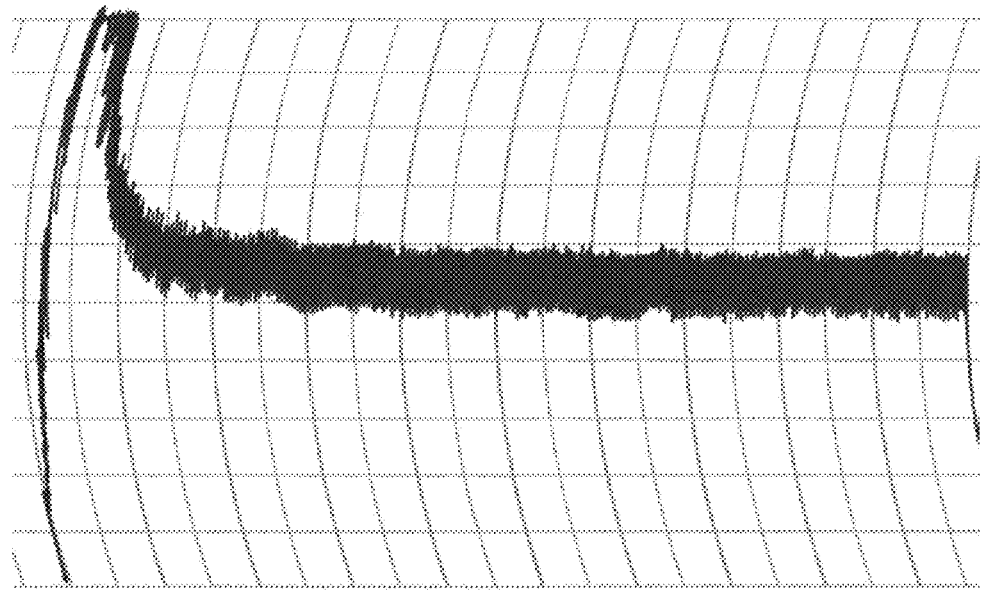

The Mixograph curves were altered when the proteins are subjected to homogenization in an aqueous medium with added malic acid and L-cysteine hydrochloride monohydrate followed by heat treatment (145-150° F.). Homogenization of high-protein wheat gluten in 2.0% or 2.7% malic acid (Samples A (FIG. 3(a)) and C (FIG. 3(c))) at the same treatment level of L-cysteine hydrochloride monohydrate (0.25%) showed slight differences in mixograph curve profile, but exhibited rapid hydration and a significantly different profile than the parent high-protein wheat gluten (i.e. Arise® 8000 in FIG. 1(b)). Similar observations as above can be made on the mixing curves when a fixed level of malic acid (2%) and 0.25 or 0.35% L-cysteine hydrochloride monohydrate were used (Sample A (FIG. 3(a)) and Sample B (FIG. 3(b))). A slightly stronger mixing curve is exhibited by L-cysteine-treated (0.25%) regular wheat gluten/pea protein isolate (70/30 ratio) as indicated by the width of the curve and the time the curve stayed high (Sample D, FIG. 3(d)). The L-cysteine-treated wheat protein compositions (Samples A, B and C) exhibited higher mixing strength compared to commercially-available sulfite-treated wheat protein isolates (Arise® 5000, Prolite® 100, and Arise® 6000) (FIGS. 2(a)-(c), respectively).

Figure 4:
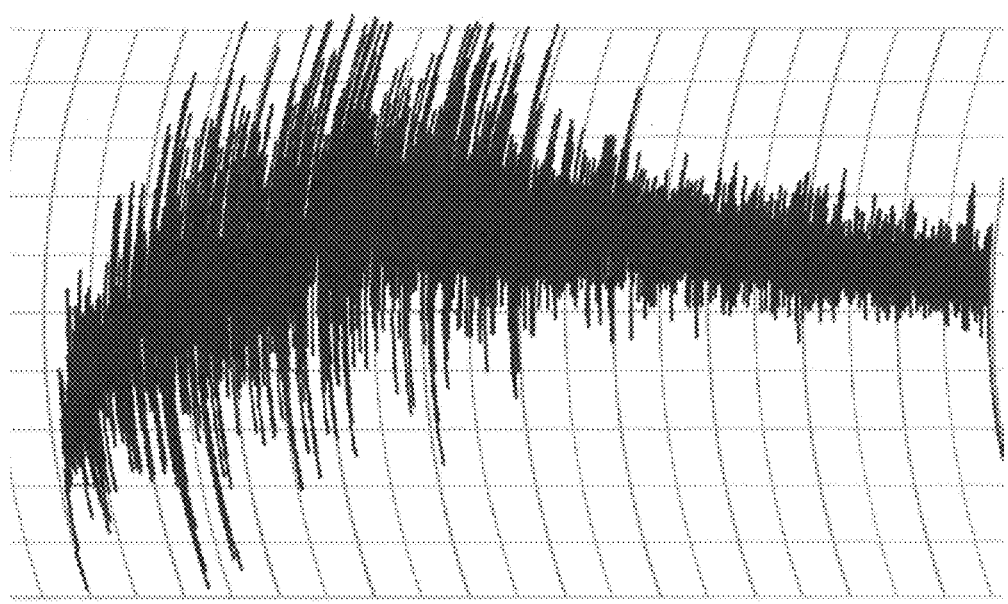
FIG. 4 is a mixograph curve of wheat flour (control) at 62% absorption (Mixing Time=3 minutes; Mixing Strength=70)
Figure 5A:
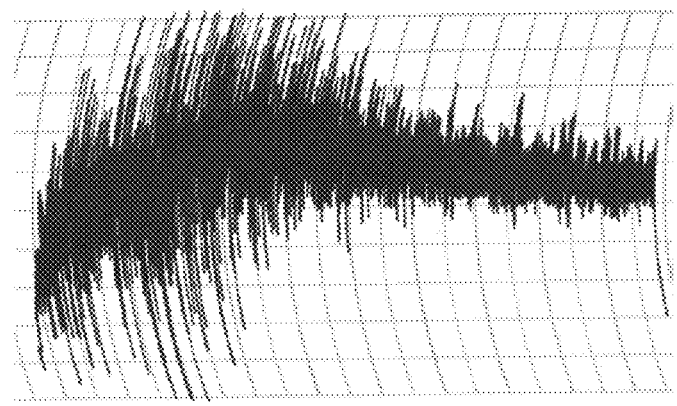
FIGS. 5(*a*)-(*c*) are mixograph profiles of wheat flour after replacing 1%, 3%, and 5%, respectively, of wheat flour with vital wheat gluten.
Figure 5B:
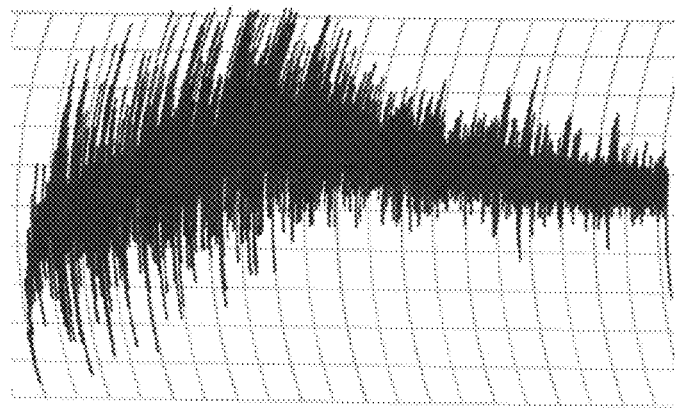
Figure 5C:
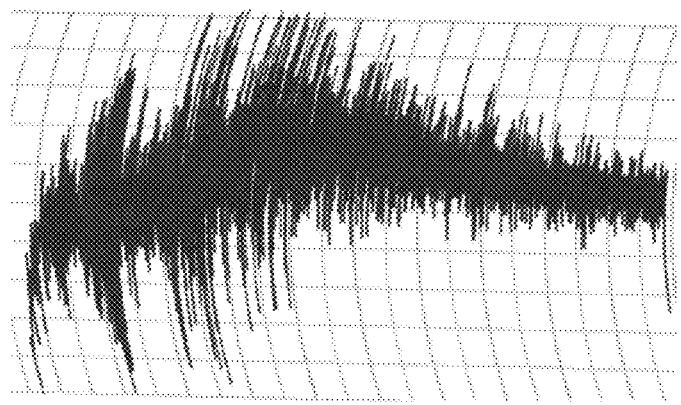
Figure 6A:
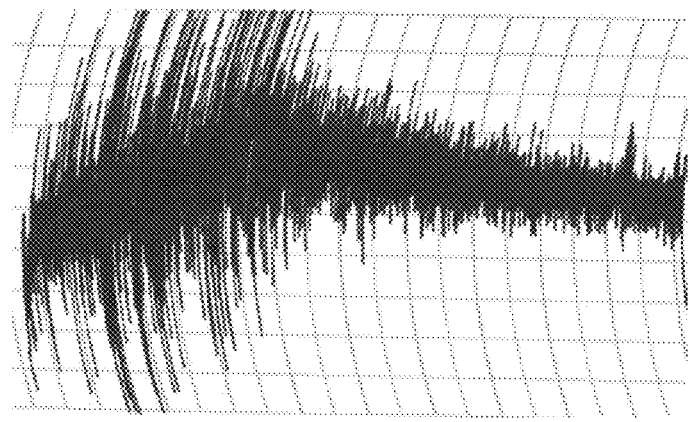
FIGS. 6(*a*)-(*c*) are mixograph profiles of wheat flour after replacing 1%, 3%, and 5%, respectively, of wheat flour with Arise® 8000 wheat protein isolate.
Figure 6B:
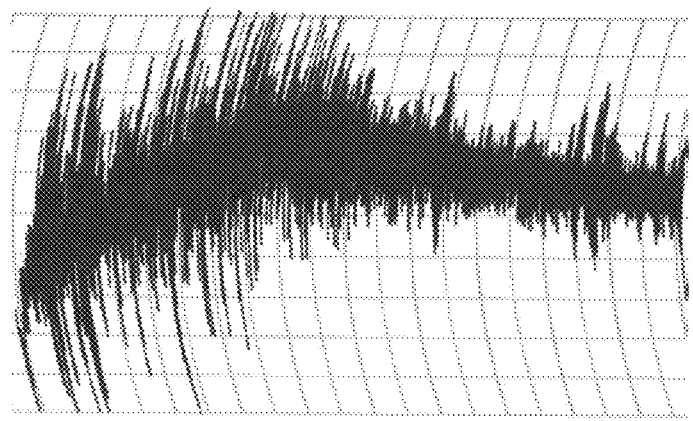
Figure 6C:
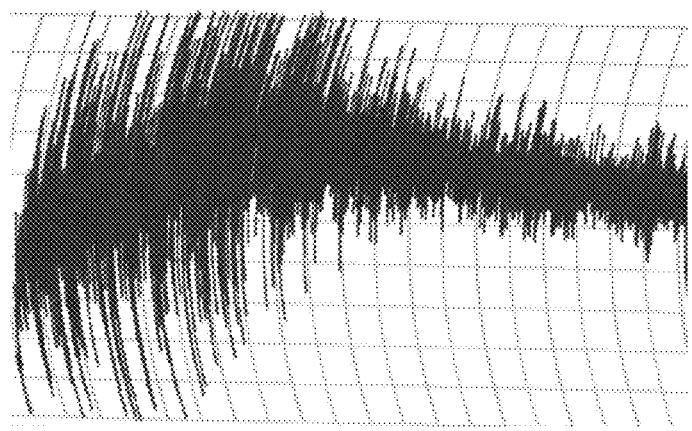
Figure 7A:
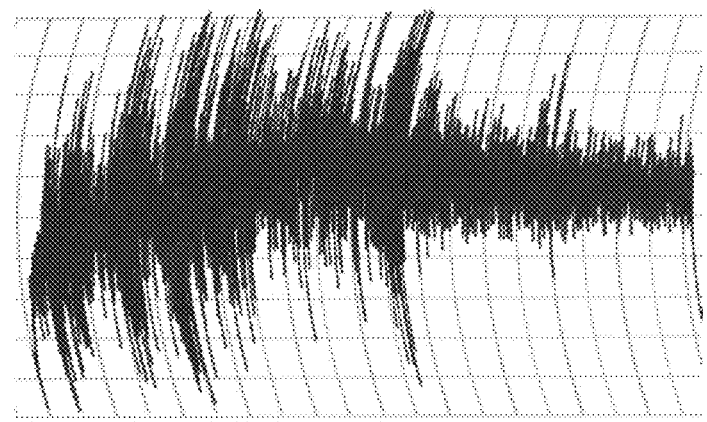
FIGS. 7(a)-(c) are mixograph profiles of wheat flour after replacing 1%, 3%, and 5%, respectively, of wheat flour with lentil protein.
Figure 7B:
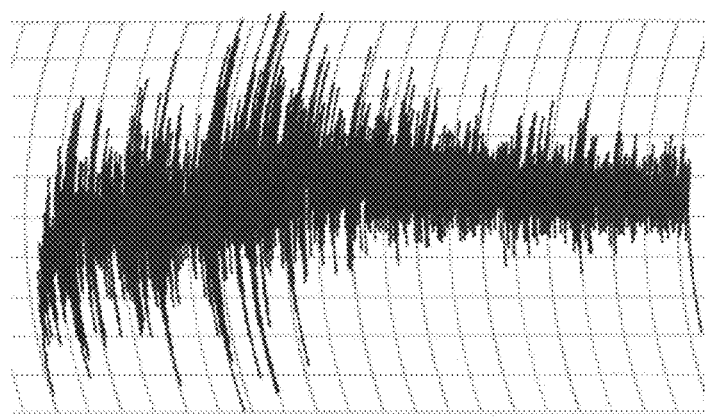
Figure 7C:
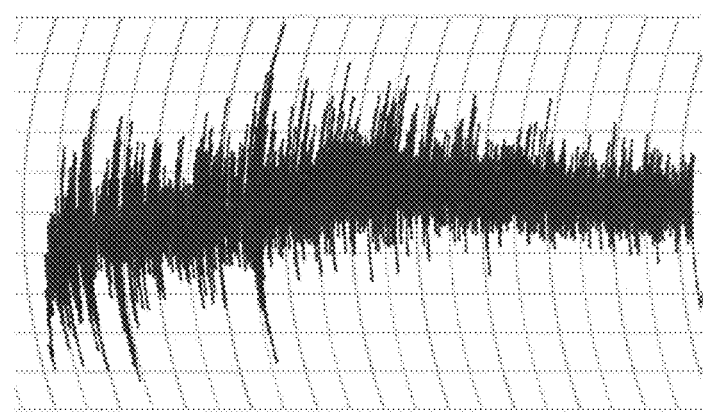
Figure 8A:
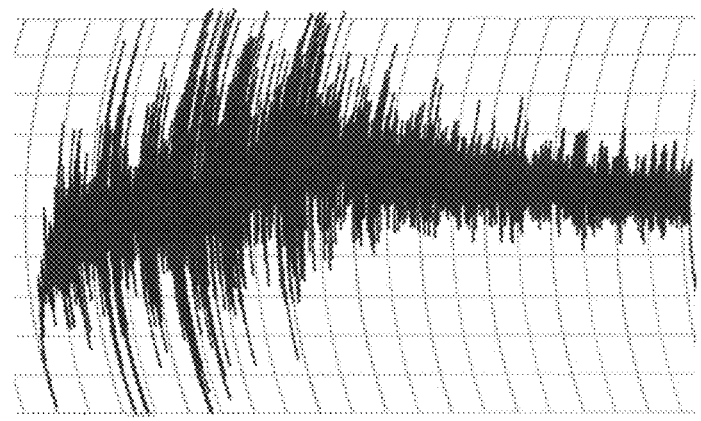
FIGS. 8(a)-(c) are mixograph profiles of wheat flour after replacing 1%, 3%, and 5%, respectively, of wheat flour with pea protein isolate.
Figure 8B:
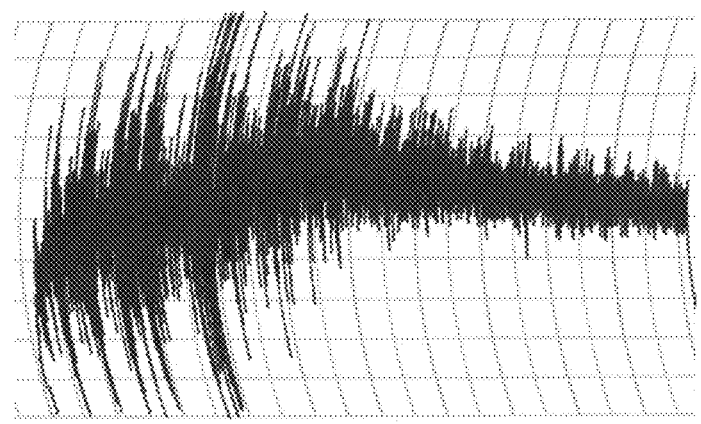
Figure 8C:
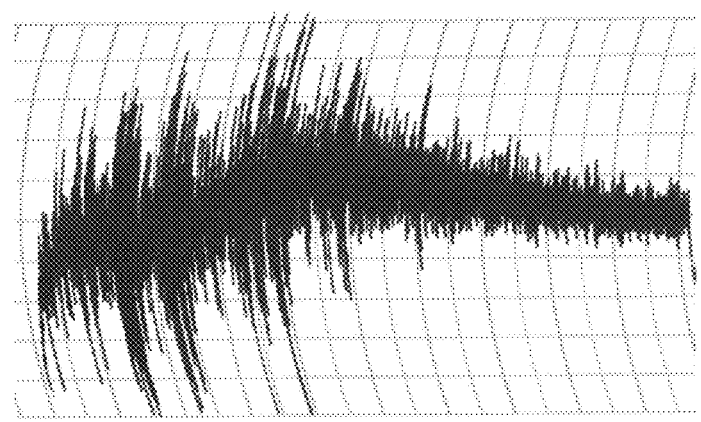

Wheat flour exhibited dough mixing strength of 70 Mixograph Units (MU) and mixing time of 3 minutes (FIG. 4). When 1%, 30%, or 5% of wheat flour is replaced with regular wheat gluten (or vital wheat gluten) (FIGS. 5(a)-(c)) or Arise® 8000 wheat protein isolate (FIGS. 6(a)-(c)), mixing time increases for both (4.0-4.5 minutes) while mixing strength stays about similar to wheat flour (65-70 MU). Replacement of wheat flour with 1%, 3%, and 5% pulse proteins (lentil protein (FIGS. 7(a)-(c)) or pea protein isolate (FIGS. 8(a)-(c))) generally increased mixing time (4.0-5.0 min), but decreased mixing strength (55-60 MU).

Figure 9A:
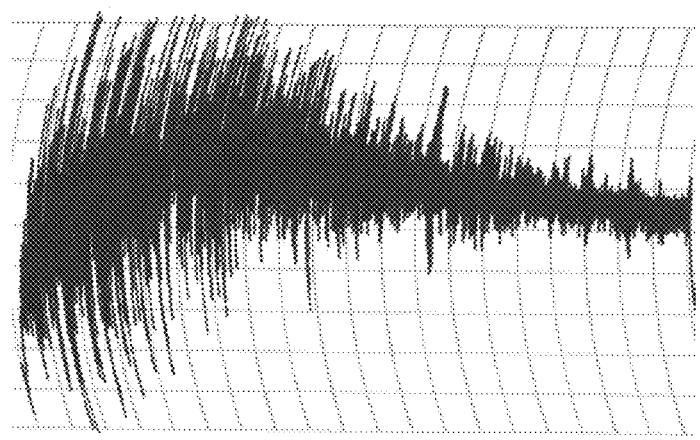
FIGS. 9(a)-(c) are mixograph profiles of wheat flour after replacing 1%, 3%, and 5%, respectively, of wheat flour with Sample E.
Figure 9B:
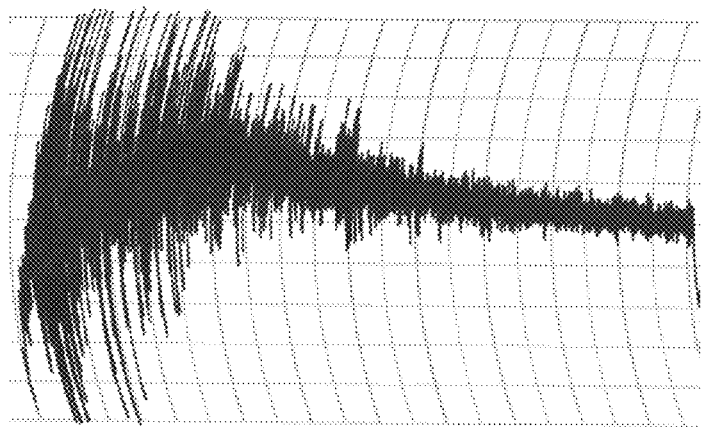
Figure 9C:
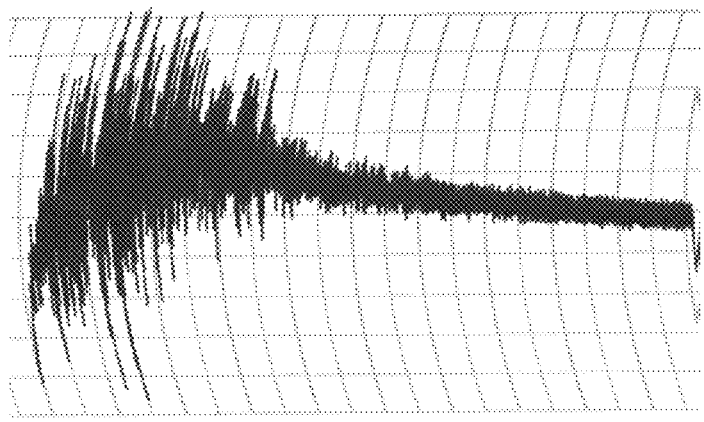
Figure 10A:
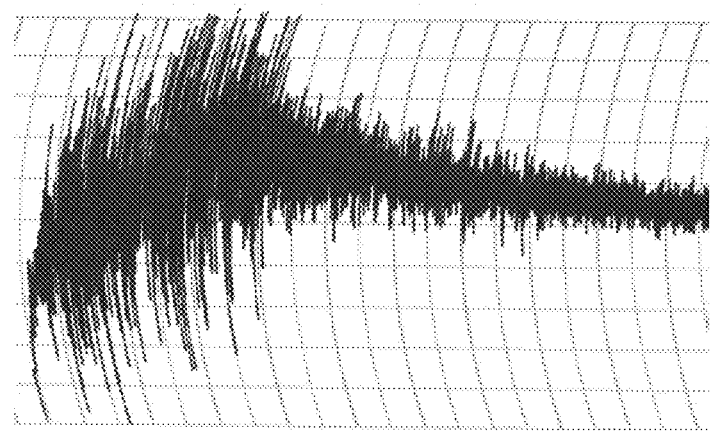
FIGS. 10(a)-(c) are mixograph profiles of wheat flour after replacing 1%, 3%, and 5%, respectively, of wheat flour with Sample F.
Figure 10B:
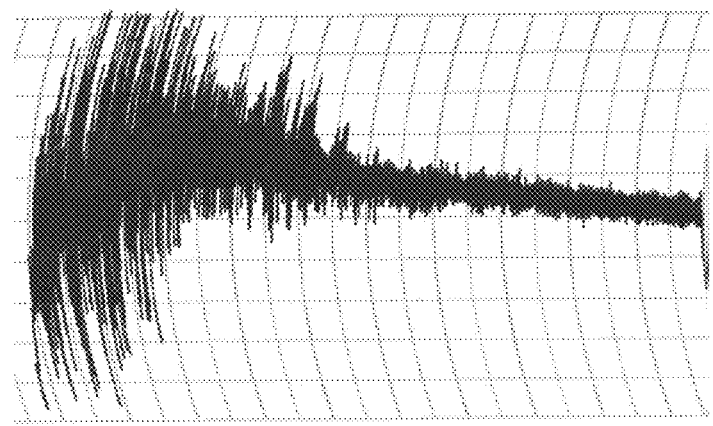
Figure 10C:
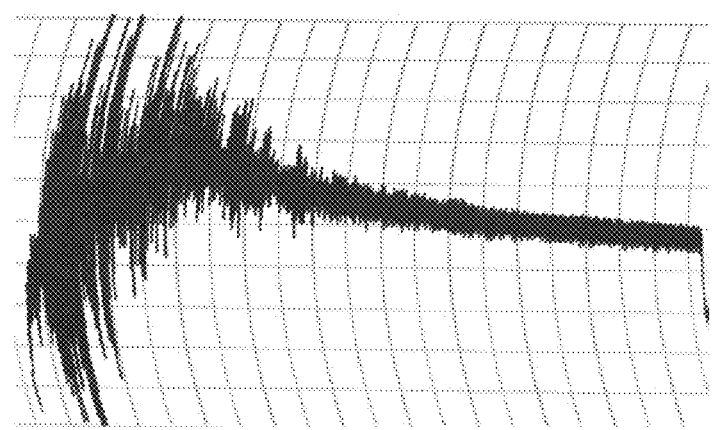
Figure 11A:
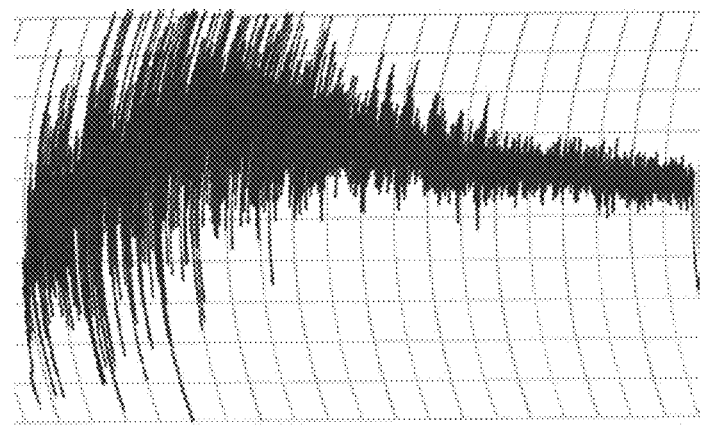
FIGS. 11(a)-(c) are mixograph profiles of wheat flour after replacing 1%, 3%, and 5%, respectively, of wheat flour with Sample G.
Figure 11B:
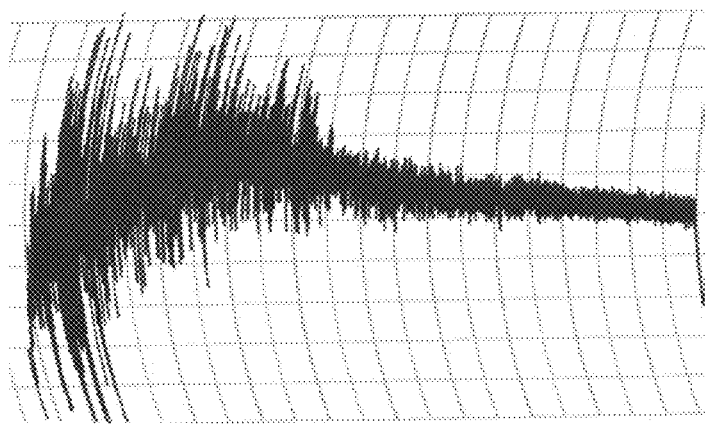
Figure 11C:
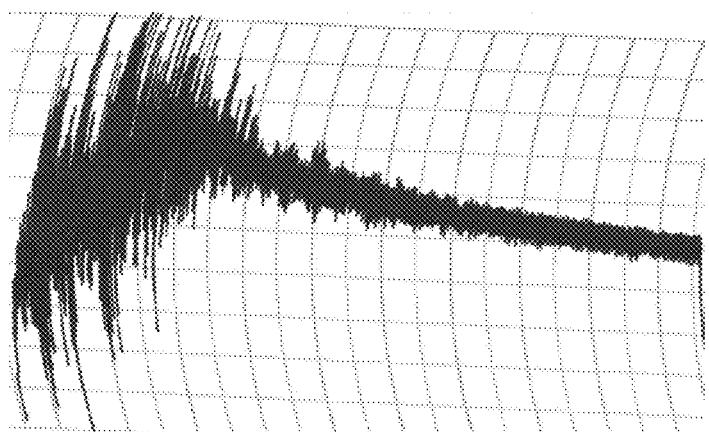
Figure 12A:
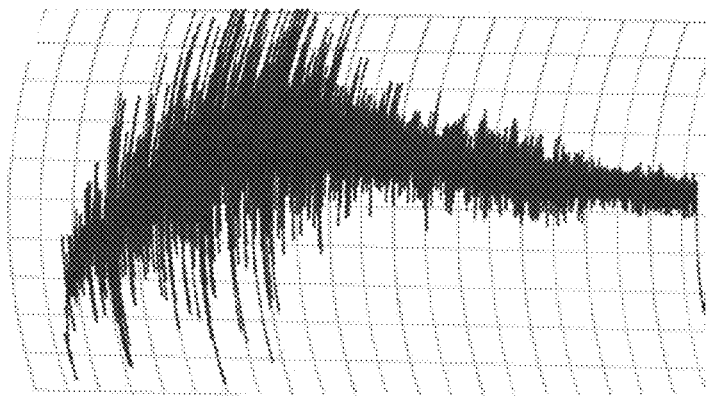
FIGS. 12(a)-(c) are mixograph profiles of wheat flour after replacing 1%, 30%, and 5%, respectively, of wheat flour with the plant production of Sample H.
Figure 12B:
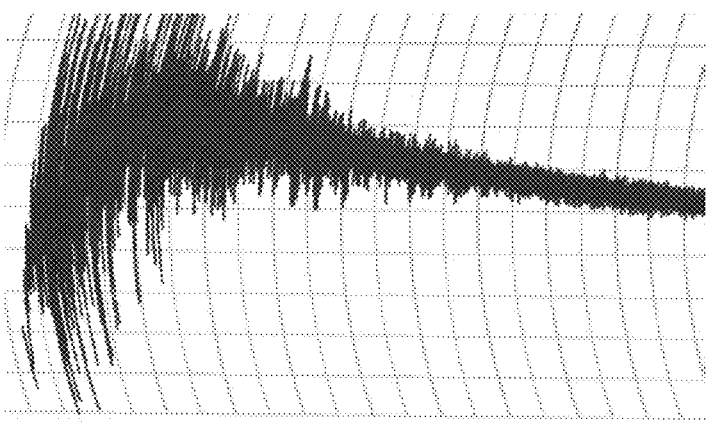
Figure 12C:
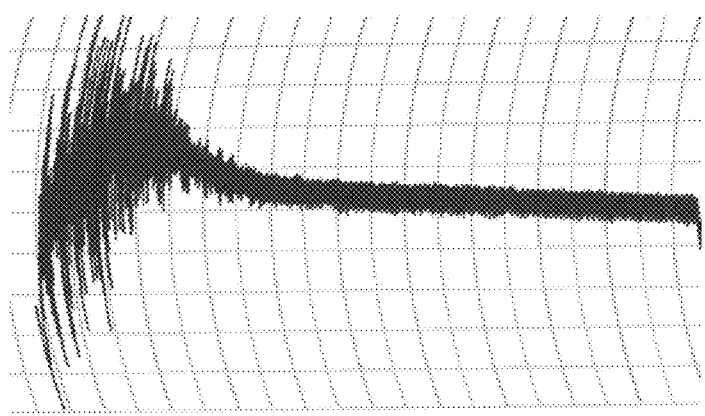
Figure 13A:
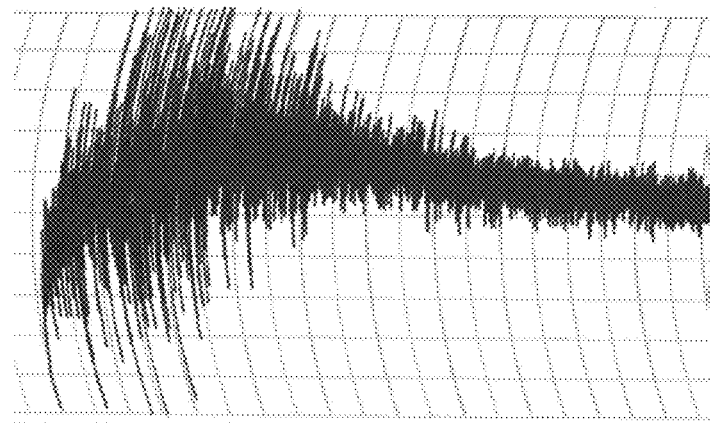
FIGS. 13(a)-(c) are mixograph profiles of wheat flour after replacing 1%, 3%, and 5%, respectively, of wheat flour with plant production of Sample I.
Figure 13B:
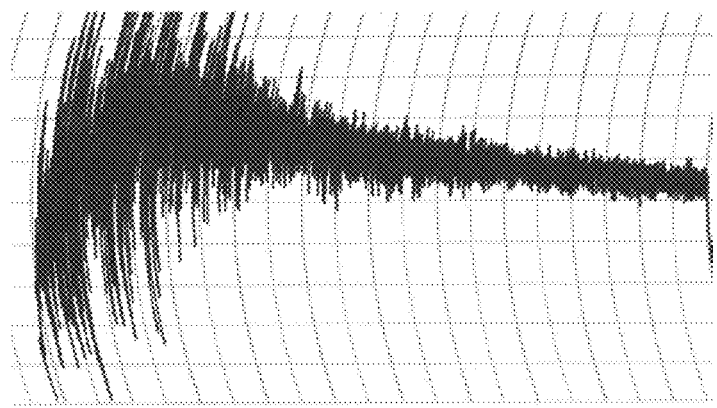
Figure 13C:
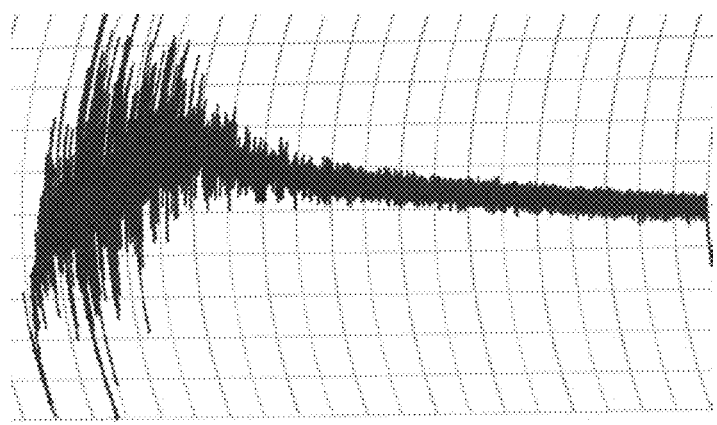

In general, L-cysteine-treated (0.10% or 0.25%) high-protein wheat gluten (pH 3.7-6.5) (Samples E, F and G) when used to replace 1%, 3%, or 5% of wheat flour decreased both mixing time and mixing strength. See, FIGS. 9(a)-(c) for Sample E, FIGS. 10(a)-(c) for Sample F, and FIGS. 11(a)-(c) for Sample G. This effect is most apparent at 5% replacement of wheat flour with mixing time down to 2.5 minutes and mixing strength down to 65. The same trend in mixing time and mixing strength is evident when the plant production of L-cysteine-treated (0.25%) protein product (pH 3.7 or 6.5) (Samples H and I) was used to replace 1, 3 or 5% of wheat flour. See FIGS. 12(a)-(c) for Sample H, and FIGS. 13(a)-(c) for Sample I. However, mixing time further dropped to 2.0-2.5 minutes at 3% level of flour replacement and down to 1.5-2.0 minutes at 5% level of flour replacement.

Figure 3D:
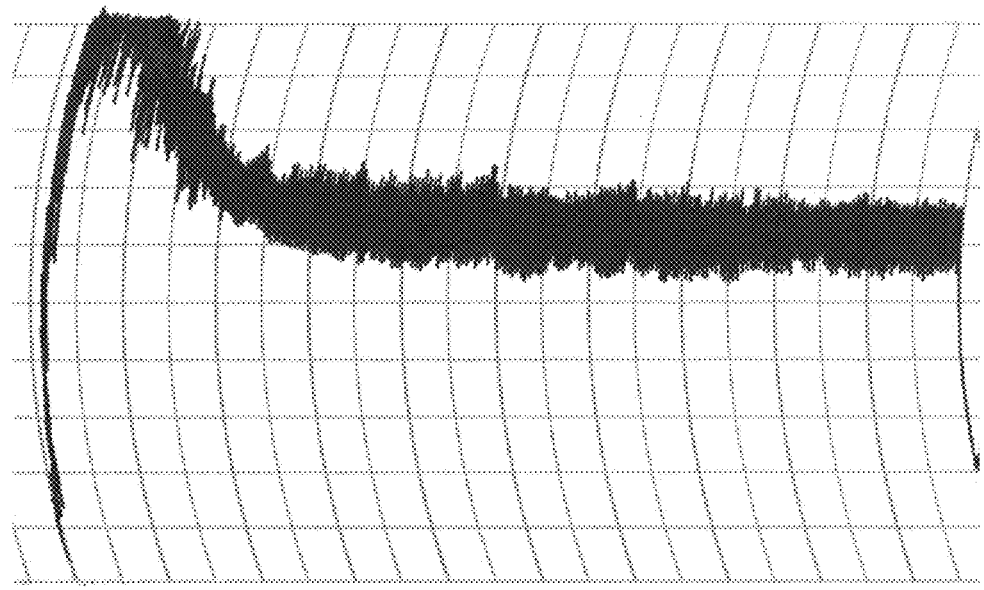
Figure 14A:
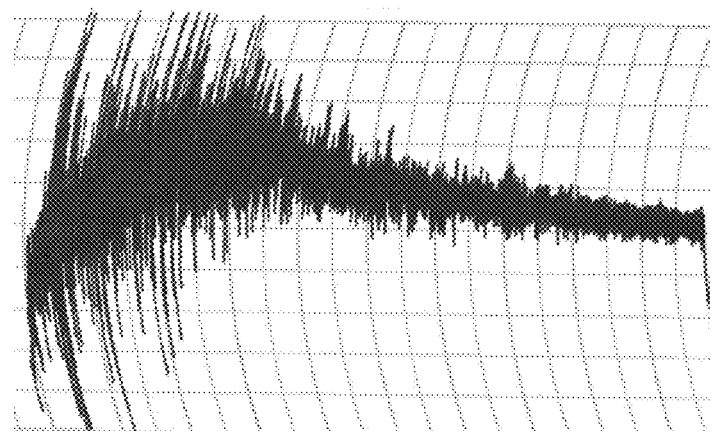
FIGS. 14(a)-(c) are mixograph profiles of wheat flour after replacing 1%, 3%, and 5%, respectively, of wheat flour with Sample D.
Figure 14B:
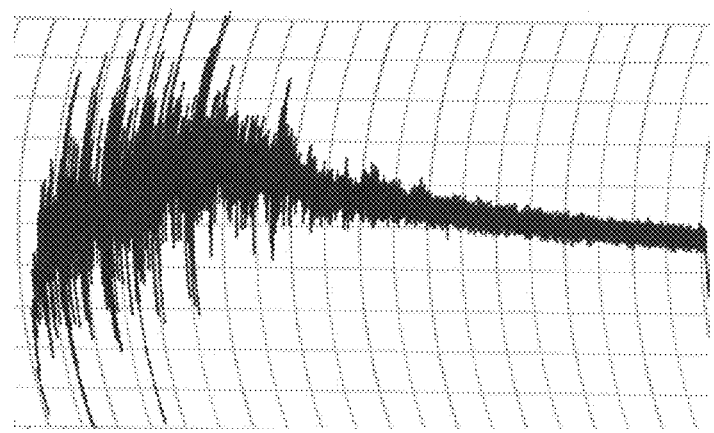
Figure 14C:
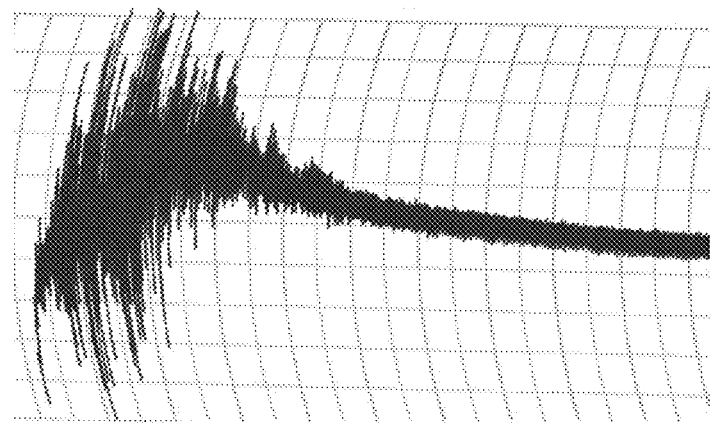
Figure 15A:
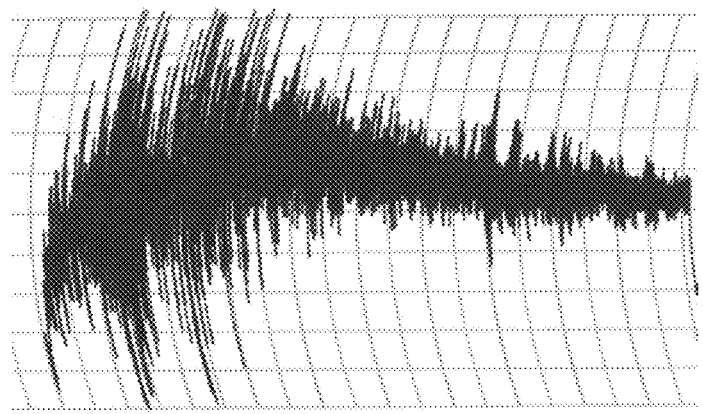
FIGS. 15(a)-(c) are mixograph profiles of wheat flour after replacing 1%, 3%, and 5%, respectively, of wheat flour with Sample V.
Figure 15B:
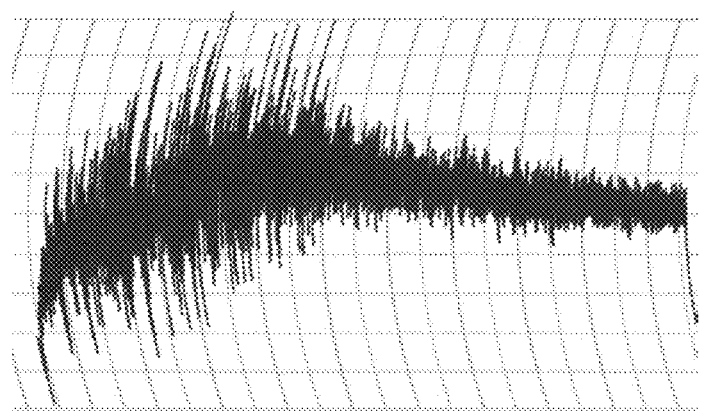
Figure 15C:
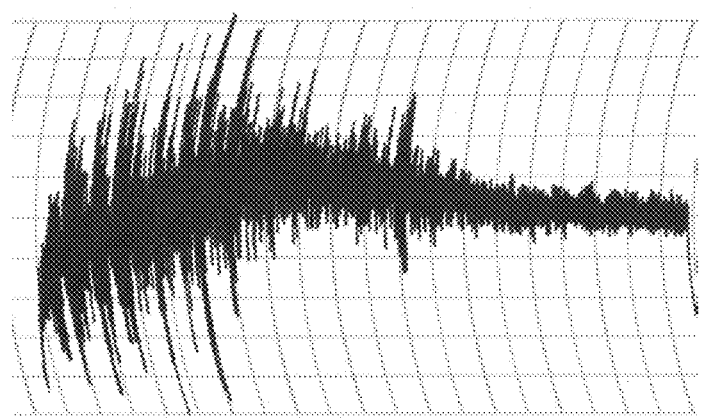
Figure 16A:
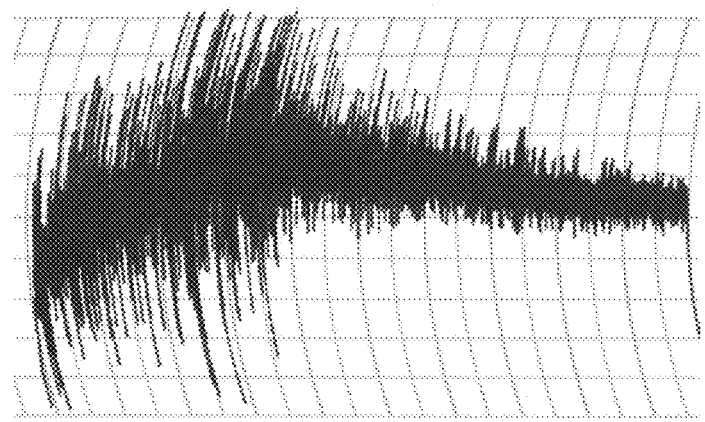
FIGS. 16(a)-(c) are mixograph profiles of wheat flour after replacing 1%, 3%, and 5%, respectively, of wheat flour with Sample W.
Figure 16B:
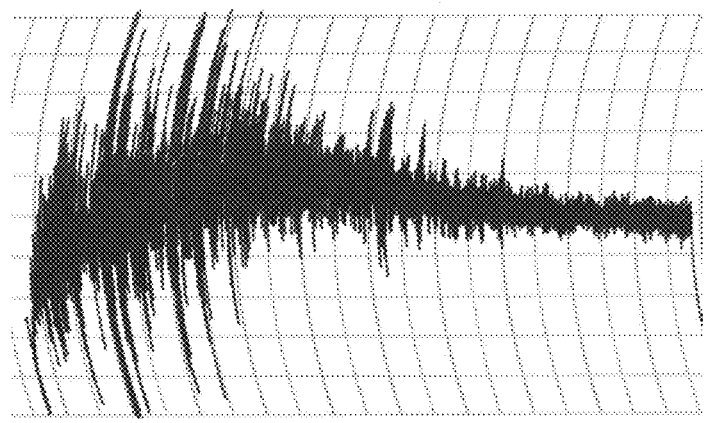
Figure 16C:
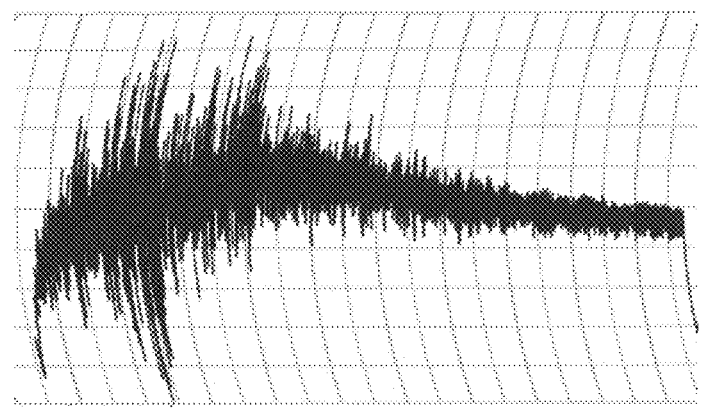

L-cysteine-treated (0.25%) protein mixture (regular wheat gluten/pea protein isolate at 70/30 ratio) (Sample D (FIG. 3(d)) resulted in reduced mixing time (2.5 minutes) and mixing strength (65) at 3 and 5% level of flour replacement (see, FIGS. 14(b) and (c), respectively). 1% flour replacement is depicted in FIG. 14(a). On the other hand, aqueous dispersion (no malic acid added) of a regular wheat gluten/lentil protein mixture (70/30 ratio) after treatment with 0.25% L-cysteine hydrochloride monohydrate (Sample V), used to replace 1%, 3%, and 5% of wheat flour, caused an increase in mixing time (3.5 minutes) and a decrease in mixing strength (60-65 MU). See, FIGS. 15(a)-(c). Further treatment of L-cysteine-treated regular wheat gluten/lentil protein mixture with protein glutaminase enzyme (Sample W), used to replace 1%, 3%, and 5% of wheat flour, had no significant effect with mixing time remaining around 3.5 minutes and mixing strength of 60-65 MU. See, FIGS. 16(a)-(c).

Figure 17:
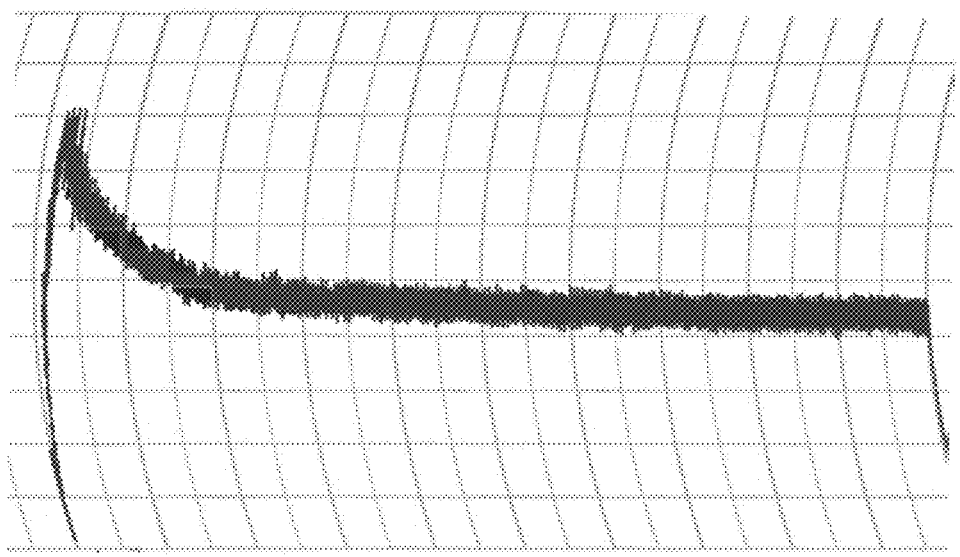
FIG. 17 is the mixograph curve of alkali-dispersed, L-cysteine-treated regular wheat gluten (Sample 197)
Figure 18A:
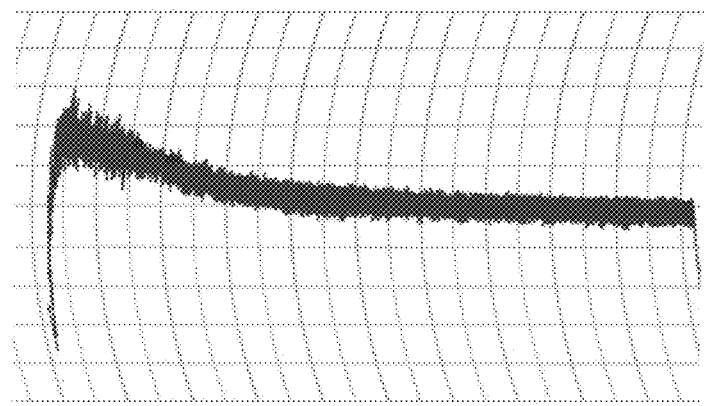
FIGS. 18(a)-(c) are mixograph profiles of alkali-dispersed, L-cysteine-treated protein mixtures (Sample 222, Sample 189 and Sample 190)
Figure 18B:
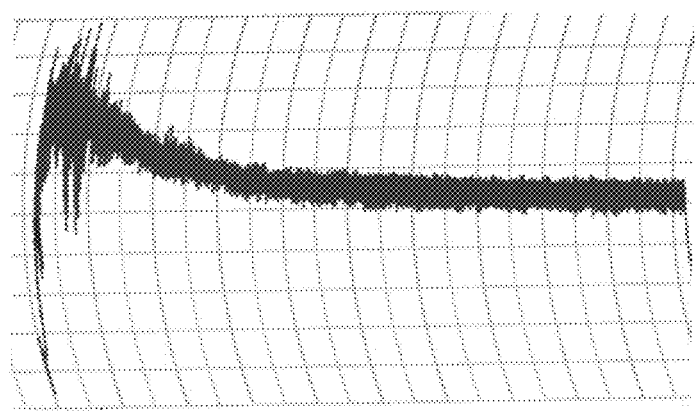
Figure 18C:
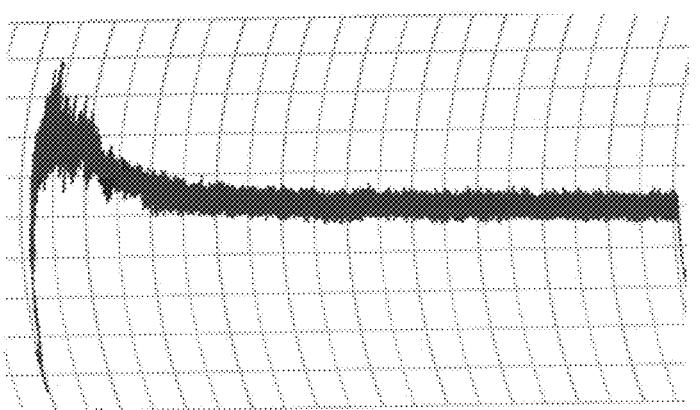
Figure 19A:
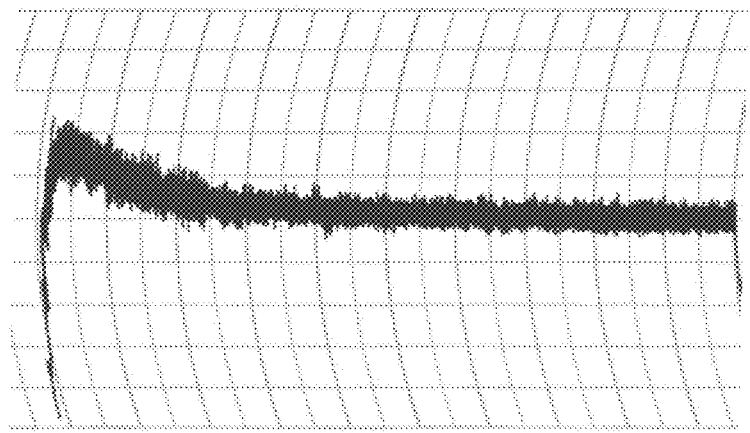
FIGS. 19(a)-(c) are mixograph profiles of alkali-dispersed, L-cysteine-treated regular wheat gluten and pea protein isolate from different manufacturers (Sample 191, Sample 224 and Sample 203)
Figure 19B:
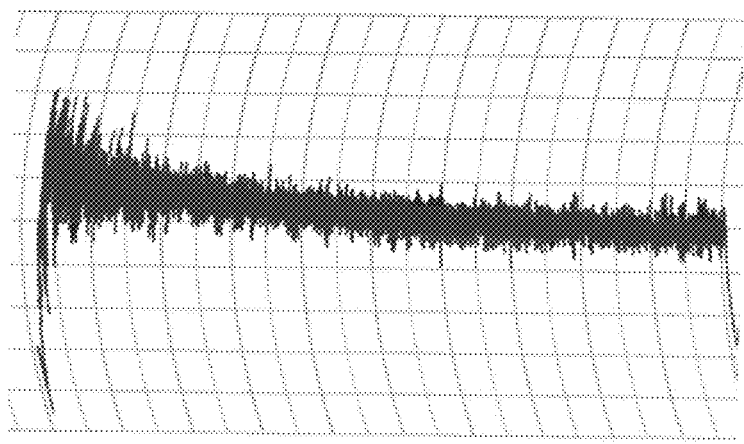
Figure 19C:
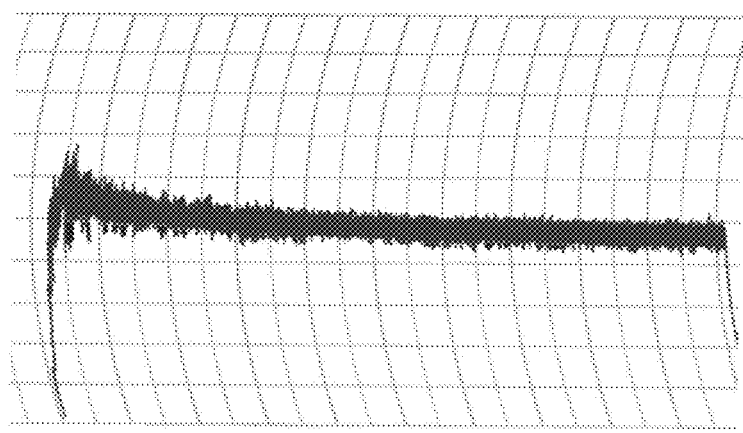
Figure 20A:
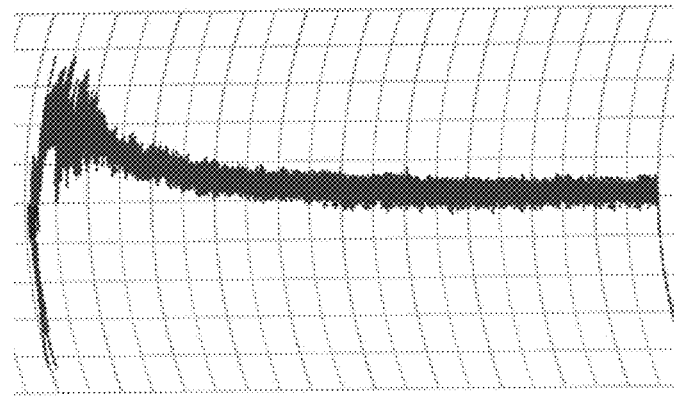
FIGS. 20(a)-(c) are mixograph profiles of alkali-dispersed, L-cysteine-treated ternary protein mixtures (Sample 193, Sample 192 and Sample 194)
Figure 20B:
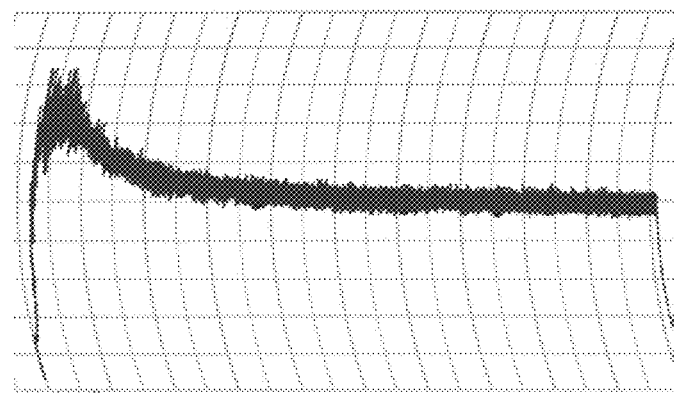
Figure 20C:
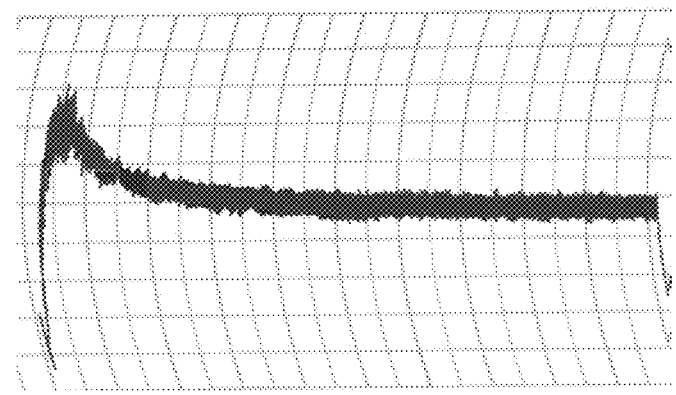
Figure 21A:
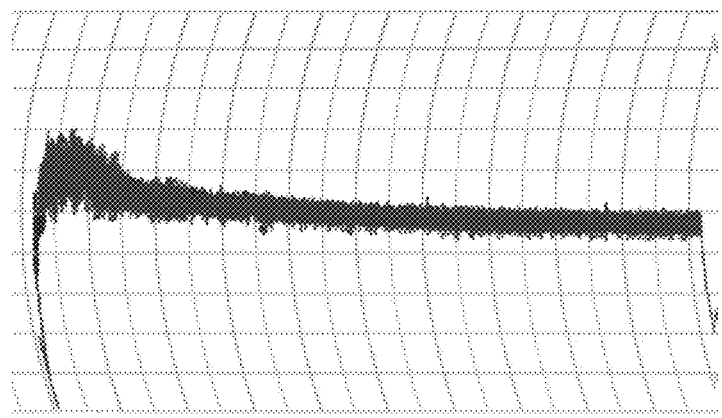
FIGS. 21(a)-(c) are mixograph profiles of alkaline-dispersed, L-cysteine-treated protein mixtures (Sample 196, Sample 204 and Sample 200)
Figure 21B:
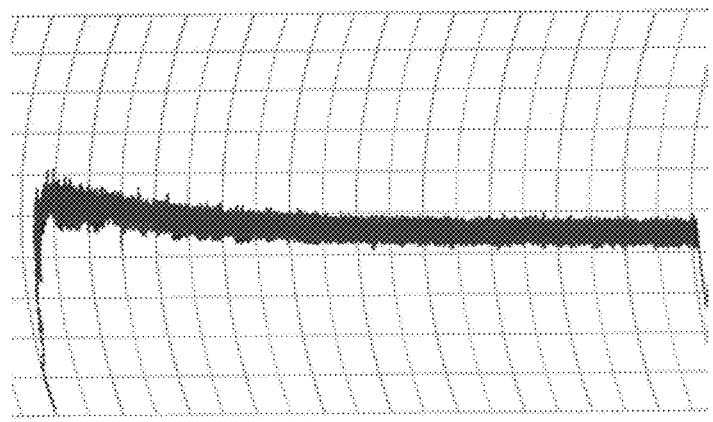
Figure 21C:
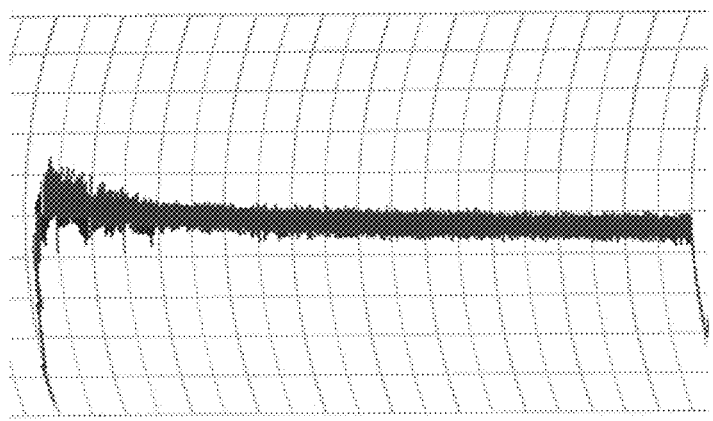

When regular wheat gluten was dispersed at alkaline pH using ammonium hydroxide and then treated with L-cysteine (Sample 197, Table 3 and FIG. 17), it exhibited rapid hydration (mixing time=0.25 min) with mixing strength of 76 MU and peak at 10 min of 43 MU. Substitution of 30% of regular wheat gluten by different pulse proteins followed by L-cysteine treatment tended to increase mixing time and peak at 10 min, but decrease mixing strength. See, FIGS. 18(a)-(c) for Samples 222, 189, and 190, respectively. See, FIGS. 19(a)-(c) for Samples 191, 224, and 203, respectively. See, FIGS. 20(a)-(c) for Samples 193, 192, and 194, respectively. A similar trend in mixograph profile was observed on samples that contain 30% substitution of regular wheat gluten by sunflower protein (Table 3), pumpkin protein or potato protein (Samples 196, 204 and 200). See FIGS. 21(a)-(c), respectively. Treatment of the slurry with 0.5% transglutaminase (Sample 231) resulted in a ten-fold increase in mixing time and elevated both mixing strength and peak at 10 min (Table 3) compared to the sample without transglutaminase treatment (Sample 189). Treatment of lentil protein and pea protein isolate (50:50 ratio) with L-cysteine at alkaline conditions (Sample 206) increased all parameters of mixing time, mixing strength and peak at 10 min. By contrast, the combination of pea protein isolate and potato protein (50:50 ratio) significantly depressed both mixing strength and peak at 10 min (Sample 207).

Compared to L-cysteine-treated regular wheat gluten (Sample 197), addition of other L-cysteine-treated protein compositions to replace wheat flour at 1, 3 or 5% level generally decrease mixing strength, but does not have a significant effect on the peak at 10 min (Table 4). Mixing time tended to increase as addition level increases.

TABLE 3

Mixing characteristics of alkaline-dispersed, L-cysteine-treated protein compositions

| Samples[a] | Mixing Time, min | Mixing Strength[b] | Peak at 10 min[b] |
|---|---|---|---|
| Sample 197 | 0.25 | 76 | 43 |
| Sample 189 | 0.7 | 75 | 49 |

TABLE 3-continued

Mixing characteristics of alkaline-dispersed, L-cysteine-treated protein compositions

| Samples[a] | Mixing Time, min | Mixing Strength[b] | Peak at 10 min[b] |
|---|---|---|---|
| Sample 192 | 0.7 | 72 | 49 |
| Sample 194 | 0.6 | 70 | 47 |
| Sample 190 | 0.5 | 70 | 50 |
| Sample 191 | 0.4 | 66 | 50 |
| Sample 193 | 0.4 | 72 | 52 |
| Sample 203 | 0.6 | 55 | 47 |
| Sample 202 | 0.5 | 60 | 52 |
| Sample 204 | 0.5 | 54 | 44 |
| Sample 196 | 0.75 | 60 | 47 |
| Sample 222 | 0.5 | 68 | 48 |
| Sample 224 | 0.5 | 64 | 50 |
| Sample 200 | 0.4 | 55 | 46 |
| Sample 206 | 1.5 | 60 | 60 |
| Sample 207 | 0.2 | 22 | 14 |
| Sample 231 | 7.0 | 83 | 80 |

[a]Refer to Table 2 for identity of samples
[b]Expressed in Mixograph Units (MU)

TABLE 4

Mixing characteristics of alkaline-dispersed, L-cysteine-treated protein compositions when added to replace wheat flour at 1, 3 or 5% level

| Samples[a] | Mixing Time, min | Mixing Strength[b] | Peak at 10 min[b] |
|---|---|---|---|
| Sample 197 | | | |
| 1% | 3.7 | 74 | 56 |
| 3% | 3.2 | 73 | 53 |
| 5% | 3.6 | 70 | 50 |
| Sample 190 | | | |
| 1% | 3.7 | 69 | 55 |
| 3% | 4.7 | 65 | 51 |
| 5% | 3.8 | 65 | 50 |
| Sample 192 | | | |
| 1% | 4.1 | 69 | 54 |
| 3% | 3.7 | 73 | 53 |
| 5% | 4.2 | 66 | 50 |
| Sample 193 | | | |
| 1% | 3.8 | 71 | 56 |
| 3% | 4.0 | 66 | 52 |
| 5% | 3.6 | 66 | 50 |
| Sample 194 | | | |
| 1% | 4.0 | 71 | 57 |
| 3% | 3.9 | 66 | 50 |
| 5% | 3.5 | 67 | 49 |
| Sample 200 | | | |
| 1% | 3.5 | 80 | 59 |
| 3% | 4.0 | 71 | 50 |
| 5% | 4.0 | 68 | 50 |
| Sample 206 | | | |
| 1% | 3.7 | 6.8 | 54 |
| 3% | 4.2 | 66 | 52 |
| 5% | 4.1 | 65 | 48 |
| Sample 207 | | | |
| 1% | 3.3 | 65 | 54 |
| 3% | 4.2 | 64 | 50 |
| 5% | 4.9 | 64 | 48 |

TABLE 4-continued

Mixing characteristics of alkaline-dispersed, L-cysteine-treated protein compositions when added to replace wheat flour at 1, 3 or 5% level

| Samples[a] | Mixing Time, min | Mixing Strength[b] | Peak at 10 min[b] |
|---|---|---|---|
| Sample 231 | | | |
| 1% | 3.8 | 68 | 54 |
| 3% | 4.2 | 68 | 54 |
| 5% | 4.2 | 64 | 53 |

[a]Refer to Table 2 for identity of samples
[b]Expressed in Mixograph Units (MU)

Emulsification, Foaming, Oil Holding and Water Holding Properties

As demonstrated in Table 5, high-protein wheat gluten treated with different levels of L-cysteine hydrochloride monohydrate (0.017-0.35%) (Samples A, B, E, O, P, Q, R, S, T and U) exhibited a much improved emulsion capacity, emulsion ability index, oil holding capacity, and water holding capacity compared with vital wheat gluten, untreated high-protein wheat gluten (Arise® 8000) and sulfite-treated high-protein wheat gluten (Arise® 5000 and Arise® 6000). These improvements in properties brought about by L-cysteine treatment of proteins are surprising especially when comparisons are made against parent proteins and sulfite-treated proteins. Emulsifying stability index is roughly comparable among all the protein samples. Overall, Sample P (high-protein wheat gluten, citric acid-dispersed, 0.017% L-cysteine-treated)), Sample Q (high-protein wheat gluten, malic acid-dispersed, 0.017% L-cysteine-treated) and Sample T (high-protein wheat gluten, malic acid-dispersed, 0.30% L-cysteine-treated) demonstrated the most number of improved functional properties compared to the other protein samples.

The functional properties of alkaline dispersed, L-cysteine-treated protein compositions exhibited some variabilities (Table 5). The emulsifying activity index among the samples is roughly comparable, but Samples 206, 192, and 207 showed higher emulsifying capacity than the others. Samples 207, 231, 197, 222, and 202 displayed higher emulsifying stability index than the others. Foaming capacity is elevated with Samples 190, 204, 191, 222, 194, and 231 while Samples 206, 189, 193, and 231 exhibited higher foaming stability than the other samples. Samples 222 and 224 have both higher oil holding capacity and water holding capacity. Samples 190 and 231 also showed high oil holding capacity while Sample 207 exhibited the highest water holding capacity. Overall, Sample 207 (pea protein isolate/potato protein 50:50 ratio), Sample 222 (regular wheat gluten/faba bean protein 70:30 ratio) and Sample 231 (regular wheat gluten/lentil protein 70:30 ratio and treated with transglutaminase) exhibited the most number of improved functional properties compared to the other protein samples. For comparison, the functional properties of soybean and milk proteins (whey protein isolate, sodium caseinate and soy protein isolate) were determined and showed the following ranges: emulsion capacity (8-9), emulsifying activity index (31.9-34.1), emulsifying stability index (172.9-262.3), oil holding capacity (1.71-2.03), water holding capacity (only for soy protein isolate, 3.3), foaming capacity (167-220) and foaming stability (32-48).

TABLE 5

Functional properties* of acid-dispersed, L-cysteine-treated high-protein wheat gluten compared to commercially-available specialty wheat proteins

| Sample[a] | EC[b] | EAI[b] | ESI[b] | OHC[b] | WHC[b] | FC[b] | FS[b] |
|---|---|---|---|---|---|---|---|
| Vital Wheat Gluten | 8.0 | 23.3 | 56.4 | 1.1 | 1.8 | 113 | 6 |
| Arise® 8000 | 10.0 | 15.8 | 65.0 | 1.1 | 1.7 | 127 | 5 |
| Arise® 5000 | 11.0 | 22.2 | 46.6 | 2.2 | 2.0 | 107 | 13 |
| Arise® 6000 | 10.0 | 16.6 | 59.0 | 2.2 | 1.9 | 80 | 8 |
| Sample O | 29.0 | 29.2 | 54.6 | 3.2 | 2.2 | 120 | 53 |
| Sample P | 23.0 | 29.0 | 90.7 | 3.2 | 2.3 | 150 | 51 |
| Sample Q | 39.5 | 29.6 | 61.6 | 3.1 | 2.9 | 114 | 6 |
| Sample R | 35.0 | 27.8 | 57.1 | 2.9 | 3.4 | 134 | 5 |
| Sample E | 31.0 | 27.3 | 52.2 | 2.6 | 3.0 | 140 | 10 |
| Sample S | 25.5 | 28.2 | 32.1 | 2.8 | 2.8 | 144 | 66 |
| Sample T | 39.0 | 27.5 | 62.1 | 3.0 | 1.7 | 204 | 34 |
| Sample A | 23.5 | 30.4 | 52.2 | 2.5 | 2.1 | 127 | 5 |
| Sample U | 23.0 | 32.6 | 52.6 | 3.6 | 2.2 | 100 | 7 |
| Sample B | 22.5 | 32.4 | 62.2 | 2.3 | 2.0 | 103 | 6 |

*Units for individual functional property are described in Methods
[a]Refer to Table 1 for identity of samples
[b]EC = Emulsifying Capacity; EAI = Emulsifying Activity Index; ESI = Emulsifying Stability Index; OHC = Oil Holding Capacity; WHC = Water Holding Capacity; FC = Foaming Capacity; FS = Foaming Stability

TABLE 6

Functional properties* of alkaline-dispersed, L-cysteine-treated protein compositions

| Samples[a] | EC[b] | EAI[b] | ESI[b] | OHC[b] | WHC[b] | FC[b] | FS[b] |
|---|---|---|---|---|---|---|---|
| Sample 197 | 11 | 26.1 | 89.2 | 1.7 | 1.49 | 140 | 5 |
| Sample 189 | 9 | 32.7 | 51.4 | 1.51 | 2.14 | 107 | 69 |
| Sample 190 | 24 | 30.9 | 65.8 | 2.71 | 1.90 | 187 | 14 |
| Sample 191 | 23 | 31.7 | 61.6 | 1.74 | 2.21 | 173 | 8 |
| Sample 192 | 27 | 31.7 | 35.0 | 1.63 | 2.19 | 127 | 16 |
| Sample 193 | 11 | 29.7 | 48.8 | 1.61 | 2.12 | 123 | 49 |
| Sample 194 | 19 | 27.4 | 27.8 | 1.59 | 2.02 | 167 | 29 |
| Sample 196 | 4 | 27.1 | 39.5 | 1.48 | 1.63 | 93 | 7 |
| Sample 200 | 9 | 30.0 | 54.7 | 1.52 | 1.61 | 140 | 5 |
| Sample 202 | 10 | 31.0 | 83.6 | 2.35 | 1.75 | 133 | 10 |
| Sample 203 | 17 | 30.5 | 66.4 | 1.8 | 1.81 | 80 | 25 |
| Sample 204 | 10 | 31.7 | 66.0 | 2.13 | 1.54 | 180 | 7 |
| Sample 206 | 37 | 29.5 | 52.9 | 1.24 | 3.1 | 127 | 89 |
| Sample 207 | 26 | 22.1 | 130.2 | 1.6 | 3.19 | 153 | 9 |
| Sample 222 | 21 | 28.3 | 83.9 | 3.24 | 2.54 | 173 | 35 |
| Sample 224 | 21 | 28.5 | 57.9 | 3.09 | 2.48 | 160 | 21 |
| Sample 231 | 17 | 28.4 | 114.0 | 2.61 | 2.25 | 167 | 48 |

Figure 22:
FIG. 22 is a photograph of the foaming properties of L-cysteine-treated (0.25%) high-protein wheat gluten/lentil protein (70/30 ratio) (Sample L) after whipping for 5 minutes in a KitchenAid Mixer (20 grams in 200 ml water)
Figure 23:
FIG. 23 is a photograph of the foaming properties of L-cysteine-treated (0.250%) regular wheat gluten/lentil protein (70/30 ratio) (Sample V) after whipping for 5 minutes in a KitchenAid Mixer (20 grams in 200 ml water)
Figure 24:
FIG. 24 is a photograph of the foaming properties of L-cysteine-treated (0.25%) regular wheat gluten/lentil protein (80/20 ratio) (Sample Y) after whipping for 5 minutes in a KitchenAid Mixer (20 grams in 200 ml water)
Figure 25:
FIG. 25 is a photograph of the foaming properties of dry-blended high-protein wheat gluten (Arise® 8000)/lentil protein (80/20 ratio) (Sample K) after whipping for 5 minutes in a KitchenAid Mixer (20 grams in 200 ml water)
Figure 26:
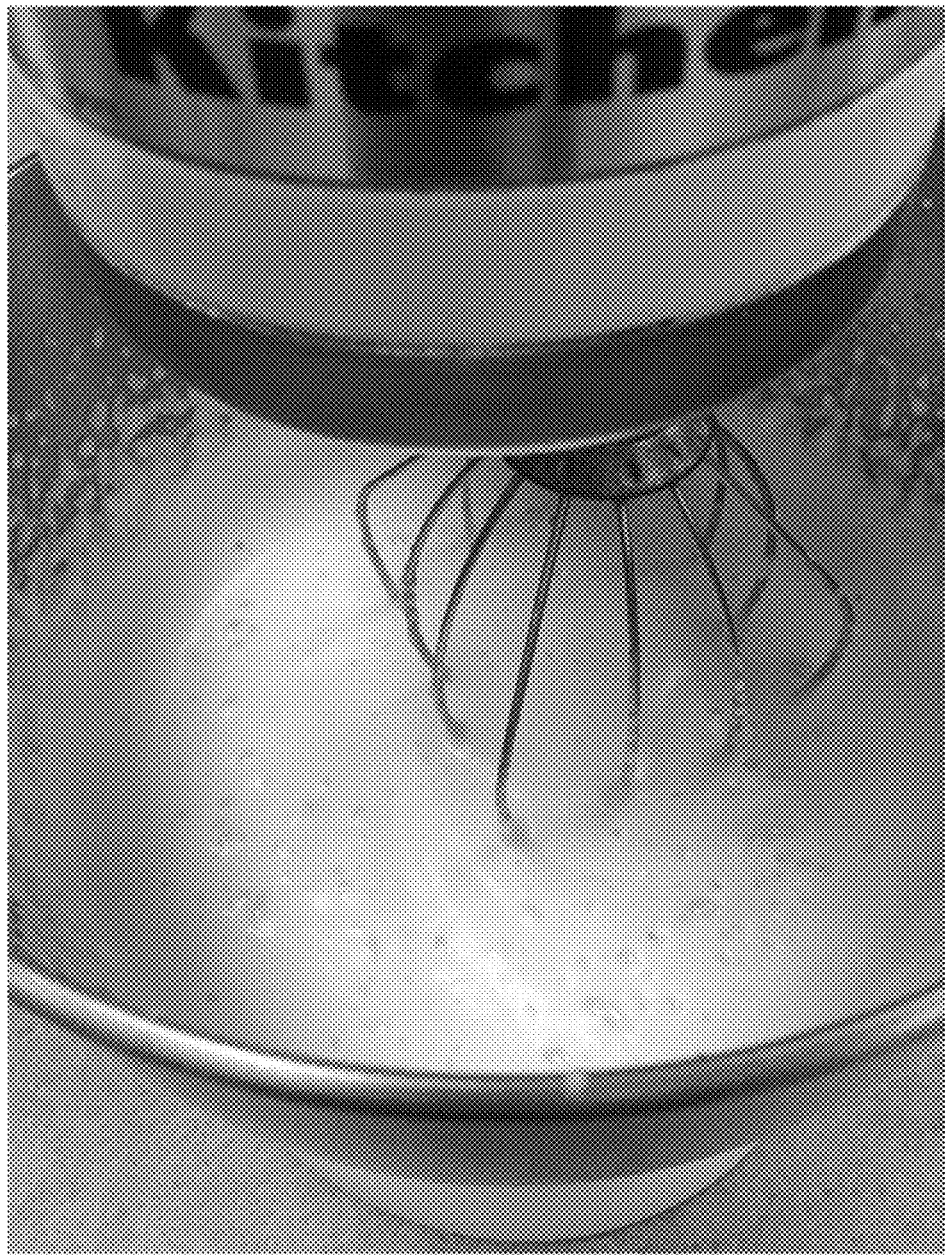
FIG. 26 is a photograph of the foaming properties of dry blended regular wheat gluten (vital wheat gluten)/lentil protein (70/30 ratio) (Sample Z) after whipping for 5 minutes in a KitchenAid Mixer (20 grams in 200 ml water)
Figure 27:
FIG. 27 is a photograph of the foaming properties of dry blended regular wheat gluten (vital wheat gluten)/lentil protein (80/20 ratio) (Sample AA) after whipping for 5 minutes in a KitchenAid Mixer (20 grams in 200 ml water)
Figure 28:
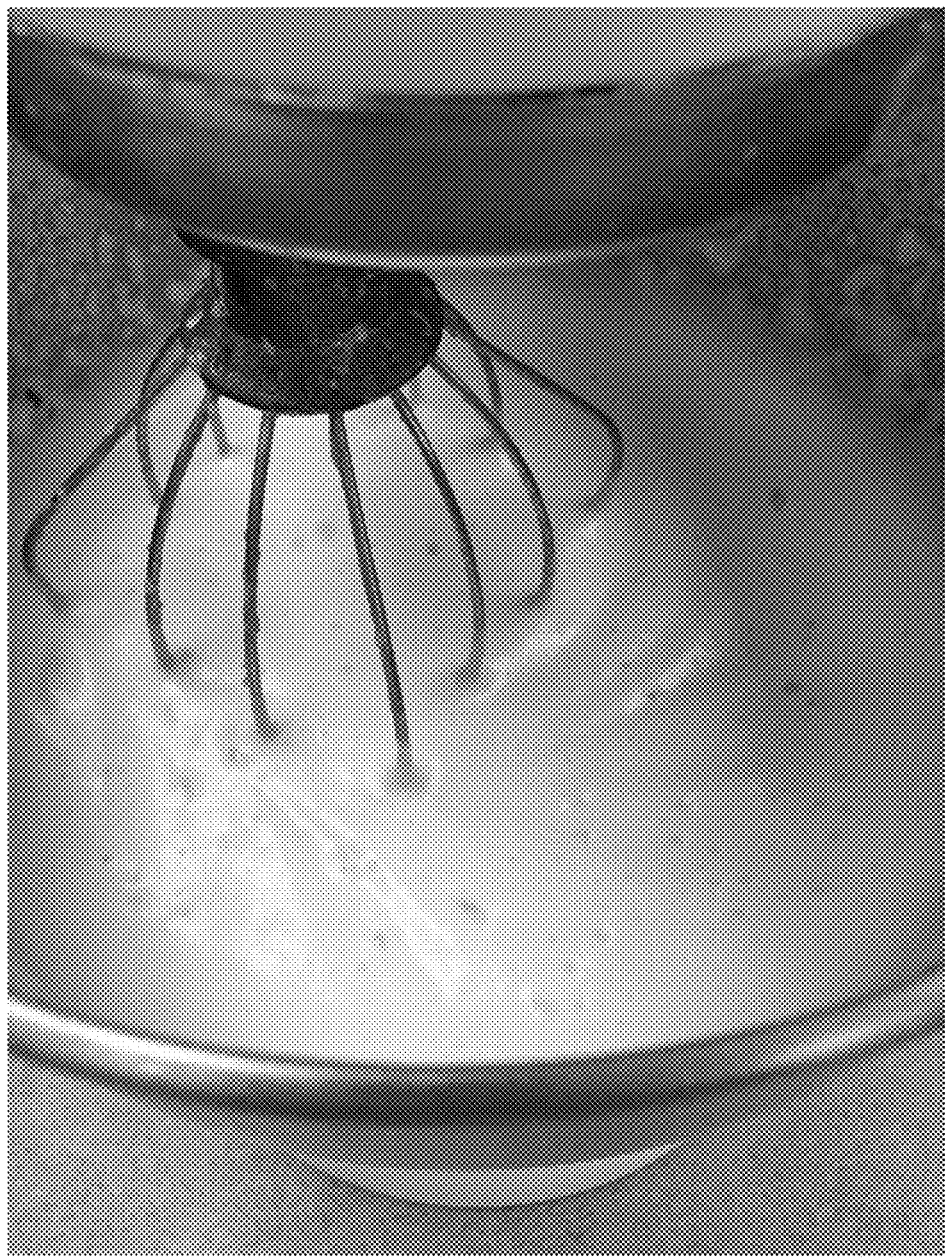
FIG. 28 is a photograph of the foaming properties of L-cysteine-treated (0.25%) pea protein isolate/lentil protein (50/50 ratio) (Sample N) after whipping for 5 minutes in a KitchenAid Mixer (20 grams in 200 ml water)
Figure 29:
FIG. 29 is a photograph of the foaming properties of dry blended pea protein isolate/lentil protein (50/50 ratio) (Sample M) after whipping for 5 minutes in a KitchenAid Mixer (20 grams in 200 ml water)

*Units for individual functional property are described in Methods
[a]Refer to Table 2 for identity of samples
[b]EC = Emulsifying Capacity; EAI = Emulsifying Activity Index; ESI = Emulsifying Stability Index; OHC = Oil Holding Capacity; WHC = Water Holding Capacity; FC = Foaming Capacity; FS = Foaming Stability Whipping Properties When a slurry of 20 grams of protein in 200 ml of water was whipped for 5 minutes in a KitchenAid Mixer with a wire whip attachment, it generated some foam whose volume depends on the foaming properties of the protein product. Neutral-dispersed, L-cysteine-treated (0.25%) high-protein wheat gluten/lentil protein (70/30 ratio) (Sample L, FIG. 22) and regular wheat gluten/lentil proteins (70-80/20-30 ratio) (Samples V and Y, FIGS. 23 and 24, respectively) generated voluminous foam compared to the dry blended versions of the parent proteins (Samples K, Z and AA, FIGS. 25-27, respectively). By contrast, neutral-dispersed, L-cysteine-treated (0.25%) pulse proteins (pea protein isolate/lentil protein at 50/50 ratio) (Sample N, FIG. 28) exhibited poor foaming properties, which agrees with the poor foaming properties of the dry blended pea protein isolate/lentil protein (50/50 ratio) (Sample M, FIG. 29). The data shows that neutral-dispersed, L-cysteine-treated wheat gluten/lentil proteins are better foam formers compared to neutral-dispersed, L-cysteine-treated pulse proteins.

Figure 30:
FIG. 30 is a photograph of the foaming properties of plant-produced acid-dispersed, L-cysteine-treated (0.25%) high-protein wheat gluten (Sample A) after whipping for 5 minutes in a KitchenAid Mixer (20 grams in 200 ml water)
Figure 31:
FIG. 31 is a photograph of the foaming properties of acid-dispersed, L-cysteine-treated (0.25%) high-protein wheat gluten (Sample H) after whipping for 5 minutes in a KitchenAid Mixer (20 grams in 200 ml water)
Figure 32:
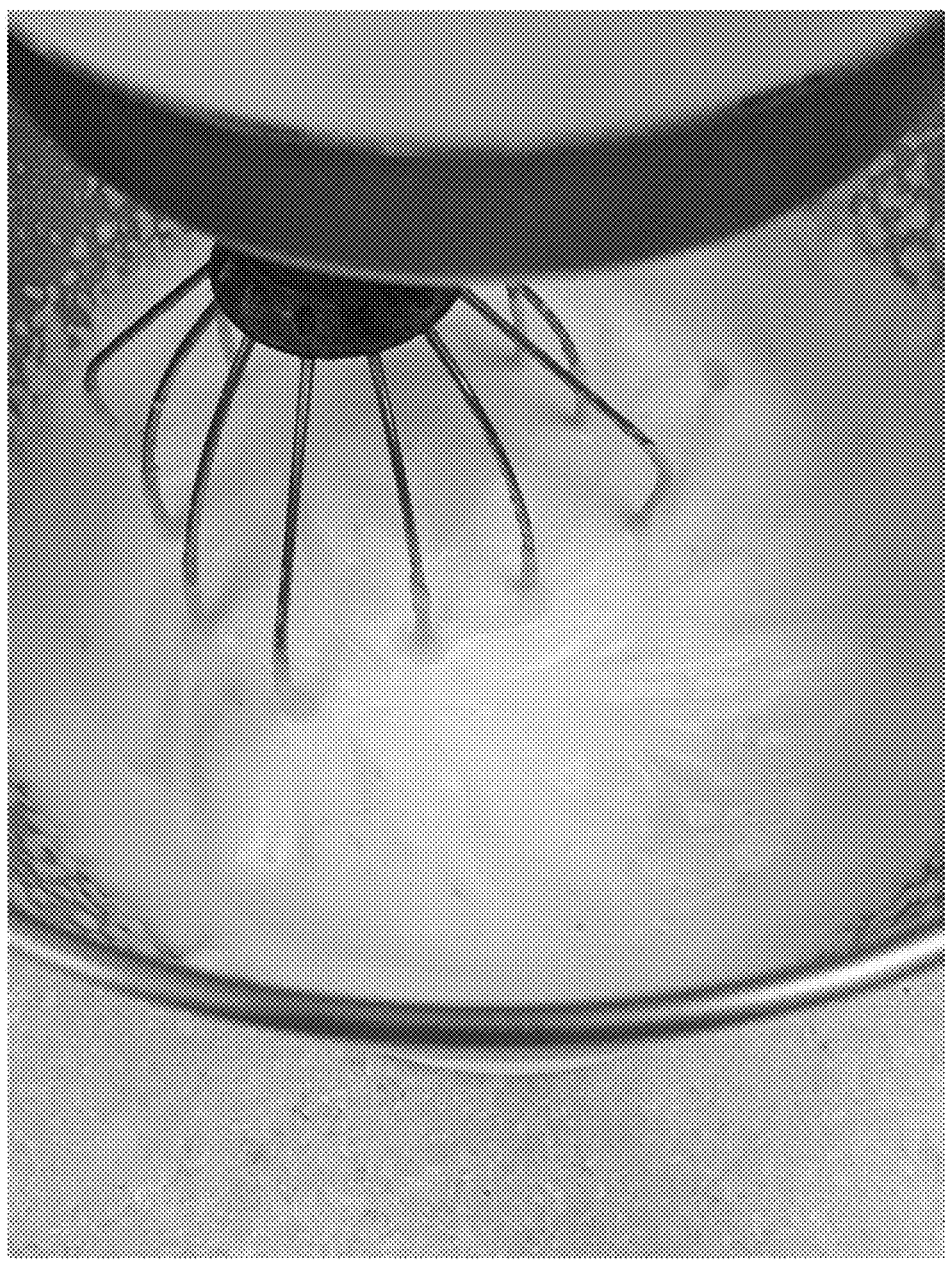
FIG. 32 is a photograph of the foaming properties of alkaline-dispersed, L-cysteine-treated (0.25%) regular wheat gluten/pea protein concentrate (70/30 ratio; Sample 190) after whipping for 5 minutes in a KitchenAid Mixer (20 grams in 200 ml water)
Figure 33:
FIG. 33 is a photograph of the foaming properties of alkaline-dispersed, L-cysteine-treated (0.25%) regular wheat gluten/ProPulse pea protein isolate (70/30 ratio; Sample 191) after whipping for 5 minutes in a KitchenAid Mixer (20 grams in 200 ml water)
Figure 34:
FIG. 34 is a photograph of the foaming properties of alkaline-dispersed, L-cysteine-treated (0.25%) regular wheat gluten/lentil protein/pea protein concentrate (70/20/10 ratio; Sample 192) after whipping for 5 minutes in a KitchenAid Mixer (20 grams in 200 ml water)
Figure 35:
FIG. 35 is a photograph of the foaming properties of alkaline-dispersed, L-cysteine-treated (0.25%) regular wheat gluten/lentil protein/ProPulse pea protein isolate (70/20/10 ratio; Sample 194) after whipping for 5 minutes in a KitchenAid Mixer (20 grams in 200 ml water)
Figure 36:
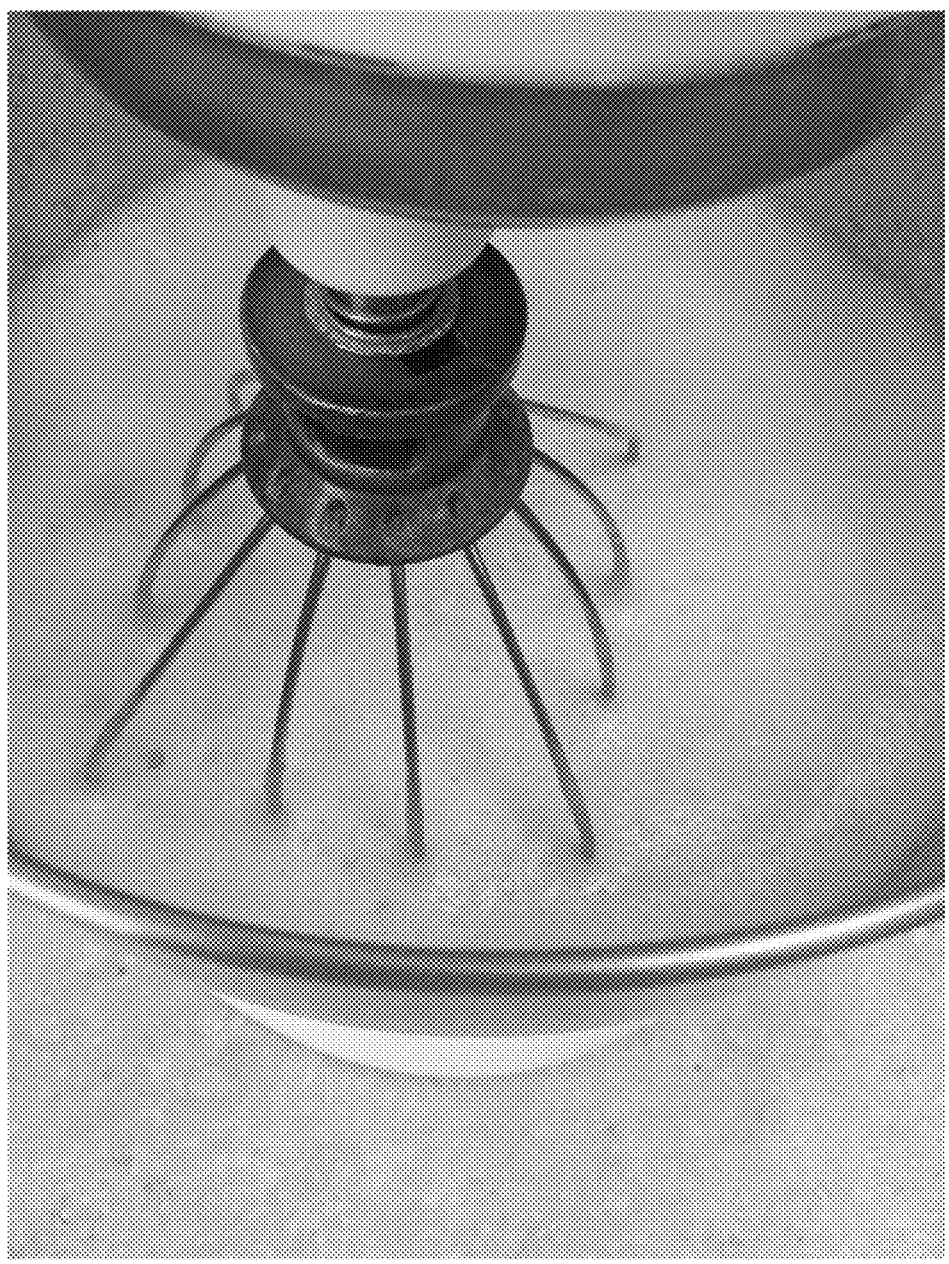
FIG. 36 is a photograph of the foaming properties of alkaline-dispersed, L-cysteine-treated (0.25%) regular wheat gluten/potato protein (70/30 ratio; Sample 196) after whipping for 5 minutes in a KitchenAid Mixer (20 grams in 200 ml water)
Figure 37:
FIG. 37 is a photograph of the foaming properties of alkaline-dispersed, L-cysteine-treated (0.25%) regular wheat gluten/pumpkin protein (70/30 ratio; Sample 204) after whipping for 5 minutes in a KitchenAid Mixer (20 grams in 200 ml water).

Low pH increases the solubility of wheat proteins. Acid-dispersed, L-cysteine-treated high-protein wheat gluten demonstrated good foaming properties as evidenced by the thick and high-volume foam generated after whipping for 5 min. See, FIG. 30 (acid-dispersed, L-cysteine-treated (0.25%) high-protein wheat gluten (Sample A) after whipping for 5 minutes in a KitchenAid Mixer, 20 grams in 200 ml water), and FIG. 31 (plant-produced, acid-dispersed, L-cysteine-treated (0.25%) high-protein wheat gluten (Sample H) after whipping for 5 minutes in a KitchenAid Mixer, 20 grams in 200 ml water).

Compared to neutral-dispersed or acid-dispersed, L-cysteine-treated protein compositions (FIGS. 22-24, 30-31), the alkaline-dispersed versions did not exhibit voluminous and thick foam after whipping (Table 7). Several samples showed water separation after letting the foam stand for 5 min with the exception of Samples 189, 192, and 194. For comparison with Samples L, V and Y (FIGS. 22-24) and Samples A and H (FIGS. 30-31), the appearance of the foam of Samples 190, 191, 192, 194, 196 and 204, after whipping for 5 minutes in a KitchenAid Mixer, 20 grams in 200 ml water, is demonstrated in FIGS. 32-37, respectively.

TABLE 7

Whipping characteristics of alkaline-dispersed, L-cysteine-treated protein compositions

| Samples[a] | Volume of Foam | Thickness of Foam | Separated Water |
|---|---|---|---|
| Sample 189 | Low | Thick | No |
| Sample 190 | Low | Thick | Yes |
| Sample 191 | Low | Thick | Yes |
| Sample 192 | Low | Thick | No |
| Sample 193 | low | Thick | Yes |
| Sample 194 | Low | Thick | No |
| Sample 196 | Low | Thick | Yes |
| Sample 204 | Low | Loose | Yes |
| Sample 206 | No foam | No foam | Yes |
| Sample 222 | Medium | Thick | Yes |
| Sample 224 | Medium | Thick | Yes |

[a]Refer to Table 2 for identity of samples

Baking Performance

Compared to commercially-available untreated high-protein wheat gluten (Arise® 8000), the L-cysteine-treated versions (0.1-0.35% L-cysteine hydrochloride monohydrate) (Samples A, B, E and J) gave a significantly higher loaf volume and a general tendency to have a reduced dough mixing time (Table 8). Sulfite-treated high-protein wheat gluten (Prolite® 100 and Arise® 5000) showed less volume enhancement compared to L-cysteine-treated high-protein wheat gluten.

TABLE 8

Pup loaf bake test of acid-dispersed, L-cysteine-treated high-protein wheat gluten at 1.5% level of addition (based on flour) compared to commercially-available specialty wheat proteins

| Samples[a] | Mixing Time, min. | Dough Strength | Volume, cc | Grain |
|---|---|---|---|---|
| Arise ® 8000 | 4.00 | Strong | 790 | Good |
| Prolite ® 100 | 4.00 | Strong | 895 | Good |
| Arise ® 5000 | 3.75 | Good | 853 | Good |
| Sample E | 4.00 | Strong | 918 | Good |
| Sample A | 3.75 | OK | 955 | Good |
| Sample J | 3.75 | Good | 943 | Good |
| Sample B | 3.50 | OK | 923 | Good |

[a]Refer to Table 1 for identity of samples

In contrast to the data on Table 8, protein mixtures (high-protein wheat gluten/lentil protein at 70/30 ratio and pea protein isolate/lentil protein at 50/50 ratio) treated with L-cysteine hydrochloride monohydrate at 0.25% (Samples L and N) level showed an elevation of dough mixing time (Table 9), but comparable loaf volume compared to commercially-available specialty wheat proteins (Arise® 8000, Arise® 5000 and Prolite® 100). However, compared to its dry blend counterparts (Samples K and M), the L-cysteine-treated protein mixtures have decreased dough mixing time and tended to have improved loaf volume.

TABLE 9

Performance of neutral-dispersed, L-cysteine-treated protein mixtures in a pup loaf bake test (added at 1.5% level) compared to commercially-available specialty wheat proteins

| Samples[a] | Mix Time, min. | Dough Strength | Volume, cc | Grain |
|---|---|---|---|---|
| Arise ® 8000 | 4.00 | Strong | 790 | Good |
| Prolite ® 100 | 4.00 | Strong | 895 | Good |
| Arise ® 5000 | 3.75 | Good | 853 | Good |
| Sample K | 4.50 | Strong | 795 | Good |
| Sample L | 4.25 | Good | 830 | Good |
| Sample M | 4.50 | Strong | 868 | Good |
| Sample N | 4.25 | OK | 893 | Good |

[a]Refer to Table 1 for identity of samples

In a chemically-leavened baked product such as layer cake, neutral-dispersed or acid-dispersed, L-cysteine treated protein compositions produced cakes with roughly equal to marginal improvements in cake volume (as evidenced by cake height) compared to the control cake without protein additive (Table 10). A second set of neutral-dispersed or acid-dispersed, L-cysteine-treated protein samples yielded cakes with borderline improvements in volume (Table 11).

TABLE 10

Performance of neutral-dispersed or acid-dispersed, L-cysteine-treated protein compositions in cake baking at 1.5% level of incorporation

| Samples[a] | Cake Height, mm |
|---|---|
| Control (No Protein Additive) | 32 |
| Sample E | 34 |
| Sample C | 34 |
| Sample B | 33 |
| Sample A | 33 |
| Sample J | 33 |
| Sample M | 32 |
| Sample K | 32 |
| Sample L | 34 |
| Sample N | 34 |

[a]Refer to Table 1 for identity of samples

TABLE 11

Performance of other neutral-dispersed or acid-dispersed,
L-cysteine-treated protein compositions in cake baking at
1.5% level of incorporation

| Samples[a] | Cake Height, mm |
|---|---|
| Control (No Protein Additive) | 31 |
| Sample O | 31 |
| Sample P | 33 |
| Sample AA | 32 |
| Sample Y | 32 |
| Sample Z | 32 |
| Sample V | 33 |
| Sample W | 32 |
| Sample X | 33 |

[a]Refer to Table 1 for identity of samples

Addition of alkaline-dispersed, L-cysteine-treated protein compositions in a bread formula at 1.5% level did not significantly improve loaf volume (Table 12). Surprisingly, addition of these protein compositions at 1.5% level in a layer cake formula (Table 13) improved cake volume especially for Samples 191, 194, 203, 204, 206, and 207.

TABLE 12

Loaf volume of breads containing 1.5% of alkaline-
dispersed, L-cysteine treated protein compositions

| Samples[a] | Loaf Volume, cc |
|---|---|
| Control (No Protein Additive) | 643 |
| Sample 197 | 636 |
| Sample 189 | 595 |
| Sample 190 | 651 |
| Sample 191 | 627 |
| Sample 203 | 626 |
| Sample 222 | 650 |
| Sample 224 | 638 |
| Sample 231 | 649 |

[a]Refer to Table 2 for identity of samples

TABLE 13

Performance of alkaline-dispersed, L-cysteine-treated protein
compositions in cake baking at 1.5% level of incorporation

| Samples[a] | Cake Height, mm |
|---|---|
| Control (No Protein Additive) | 30 |
| Sample 197 | 31 |
| Sample 189 | 32 |
| Sample 190 | 32 |
| Sample 191 | 36 |
| Sample 192 | 33 |
| Sample 193 | 30 |
| Sample 194 | 35 |
| Sample 196 | 31 |
| Sample 200 | 31 |
| Sample 202 | 33 |
| Sample 203 | 35 |
| Sample 204 | 36 |
| Sample 206 | 34 |
| Sample 207 | 35 |
| Sample 222 | 32 |
| Sample 224 | 32 |
| Sample 231 | 30 |

[a]Refer to Table 2 for identity of samples

Emulsifier Replacement

Neutral-dispersed, or acid-dispersed high-protein wheat gluten treated with L-cysteine hydrochloride monohydrate (0.1-0.35%) (Samples B, C, E, J, N, U, V, W and X) yielded breads with loaf volumes of 855-868 cc which matched the performance of DATEM or SSL (830-865 cc) in a bread baking test (Table 14). The highest increase in loaf volume (910 cc) was exhibited by L-cysteine-treated regular wheat gluten/pea protein isolate (70/30 ratio) (Sample D). A 70/30 ratio of L-cysteine-treated wheat gluten/lentil protein with or without protein glutaminase treatment (Sample W and Sample V, respectively) as well as a 50/50 ratio of cysteine-treated pea protein isolate/lentil protein with or without protein glutaminase treatment (Sample X and Sample N, respectively) gave breads with loaf volume of 868-875 cc and 855-865 cc, which are comparable to the loaf volume of breads with DATEM or SSL. Thus, total replacement of emulsifiers like DATEM and SSL can be accomplished with L-cysteine-treated proteins or protein mixtures.

TABLE 14

Performance of neutral-dispersed or acid-dispersed L-
cysteine-treated proteins or protein mixtures in bread as
a 100% replacement of DATEM and SSL (added at
0.5% based on flour)

| Sample[a] | Dough Strength | Proof Height, mm | Volume, cc |
|---|---|---|---|
| DATEM | Good | 81 | 865 |
| SSL | Good | 78 | 830 |
| Sample J | Good | 77 | 860 |
| Sample U | OK | 76 | 855 |
| Sample B | OK | 78 | 868 |
| Sample C | OK | 76 | 855 |
| Sample E | Good | 76 | 868 |
| Sample D | Good | 81 | 910 |
| Sample V | Good | 76 | 875 |
| Sample W | Very Good | 83 | 868 |
| Sample N | Good | 80 | 865 |
| Sample X | Good | 77 | 855 |

[a]Refer to Table 1 for identity of samples

In another bake test that uses higher level of SSL (1%) in the formula, 50% of SSL can be successfully replaced with regular wheat gluten/lentil protein (70/30 ratio) (Sample V) and with pea protein isolate/lentil protein (50/50 ratio) (Sample N), both neutral-dispersed and treated with 0.25% L-cysteine hydrochloride monohydrate, and exhibiting significantly higher loaf volumes than the control (Table 15).

TABLE 15

Performance of neutral-dispersed, L-cysteine-treated protein
mixtures in bread as a 50% Replacement of SSL (1%)

| Samples[a] | Volume, cc | Crumb Quality |
|---|---|---|
| Control | 457 | 7 |
| Sample V | 551 | 7 |
| Sample N | 630 | 6 |

[a]Refer to Table 1 for identity of samples

An acid-dispersed, L-cysteine-treated high-protein wheat gluten (Sample H) at 0.5% level showed the best performance after quadruplicate baking trials to successfully replace SSL or DATEM in a bread formula (Table 16). Sample V, but not Sample N, was able to duplicate the performance of SSL in bread baking (Table 17). In the case of acid-dispersed, L-cysteine-treated protein compositions added at 0.5% level, several samples out-performed SSL in bread baking namely Samples E, B, and C (Table 18). Further bread baking trials to replace SSL or DATEM showed that alkaline-dispersed, L-cysteine treated protein compositions (Samples 196 and 204) exhibited higher loaf volume than either SSL or DATEM while Samples 189, 191, 203, and 222 essentially matched the performance of either SSL or DATEM (Table 19).

TABLE 16

Loaf volume of breads containing 0.5% of Sample H, SSL or DATEM

| Samples | Loaf Volume*, cc |
|---|---|
| Control (No Additive) | 627 |
| SSL | 695 |
| DATEM | 702 |
| Sample H[a] | 699 |

[a]Refer to Table 1 for identity of sample
*Average of four replicates

TABLE 17

Performance of neutral-dispersed, L-cysteine-treated protein compositions compared to SSL at 0.5% level

| Samples[a] | Loaf Volume, cc |
|---|---|
| SSL | 593 |
| Sample V | 608 |
| Sample N | 556 |

[a]Refer to Table 1 for identity of samples

TABLE 18

Performance of commercially-available wheat protein isolates and acid-dispersed, L-cysteine-treated protein compositions in bread as a 100% replacement of SSL (added at 0.5% based on flour)

| Samples[a] | Loaf Volume, cc |
|---|---|
| Control (No Additive) | 691 |
| SSL | 717 |
| Arise ® 5000 | 717 |
| Prolite ® 100 | 752 |
| Arise ® 8000 | 744 |
| Sample E | 779 |
| Sample C | 753 |
| Sample B | 771 |
| Sample V | 639 |
| Sample N | 724 |

[a]Refer to Table 1 for identity of samples

TABLE 19

Performance of alkaline dispersed, L-cysteine-treated protein compositions in bread as a 100% replacement of SSL or DATEM (added at 0.5% based on flour)

| Samples[a] | Loaf Volume*, cc |
|---|---|
| Control (No Additive) | 626 |
| SSL | 630 |
| DATEM | 651 |
| Sample 189 | 662 |
| Sample 191 | 630 |
| Sample 196 | 675 |
| Sample 203 | 652 |
| Sample 204 | 678 |
| Sample 222 | 641 |

[a]Refer to Table 2 for identity of samples
*Average of three replicates

We claim:

1. A food additive comprising at least one protein material,
wherein the protein material has a protein content of at least 50% by weight of the protein material based on total solids content,
wherein the protein material has been homogenized in an aqueous slurry with from about 0.1% to about 3.3% by weight of L-cysteine, or a derivative thereof, based on total solids content of the protein material and reacted under added heat, and
wherein the food additive further comprises an organic or mineral acid selected from the group consisting of hydrochloric acid, sulfuric acid, acetic acid, lactic acid, malic acid, citric acid, succinic acid, fumaric acid, and combinations thereof.

2. The food additive of claim 1, wherein the at least one protein material is a plant-based protein.

3. The food additive of claim 2, wherein the plant based protein is selected from the group consisting of grain proteins, pseudocereal proteins, pulse proteins, chia seed, lupin, microalgae, soy, canola, mycoproteins and mixtures thereof.

4. The food additive of claim 2, wherein the plant-based protein comprises a protein derived from wheat, corn, rice, barley, rye, triticale, sorghum, oats, pearl millet, ancient grains, amaranth, buckwheat, quinoa, pea, lentil, faba bean, chickpea, or combinations thereof.

5. The food additive of claim 4, wherein the plant-based protein comprises one or more members selected from the group consisting of wet gluten dough, high-protein wet gluten dough, vital wheat gluten, and wheat protein isolate.

6. The food additive of claim 1, wherein the at least one protein material is an animal-based protein.

7. The food additive of claim 6, wherein the animal-based protein comprises a milk protein or egg protein.

8. The food additive of claim 7, wherein the animal-based protein comprises a milk protein and the milk protein comprises casein, whey, or combinations thereof.

9. The food additive of claim 1, wherein the at least one protein material comprises a mixture of plant-based and animal-based proteins.

10. The food additive of claim 1, wherein the at least one protein material has been treated with from about 0.001% to about 5% by weight of glutaminase or transglutaminase, based on total solids content of the protein material.

11. The food additive of claim 1, wherein the food additive has a protein content of at least 70% by weight.

12. The food additive of claim 1, wherein the food additive comprises an alkaline pH adjusting agent.

13. The food additive of claim 12, wherein the alkaline pH adjusting agent is selected from the group consisting of ammonium hydroxide, sodium hydroxide, potassium hydroxide, calcium hydroxide, magnesium hydroxide, and combinations thereof.

14. The food additive of claim 1, wherein the food additive exhibits at least one improved functional characteristic relative to an otherwise identical food additive comprising a protein material that has not been reacted with the L-cysteine, the at least one improved functional characteristic is selected from the group consisting of:
 (a) emulsification capacity,
 (b) oil holding capacity,
 (c) water holding capacity,
 (d) whipping properties,
 (e) extensibility,
 (f) reduced dough mixing time during bread making,
 (d) emulsifier replacement ability,
 (g) improved loaf volume in bread making, and
 (i) improved cake volume in cake making.

15. The food additive of claim 1, wherein the L-cysteine, or derivative thereof, is plant-derived.

16. The food additive of claim 1, wherein the L-cysteine, or derivative thereof, is animal-derived.

17. The food additive of claim 1, wherein the food additive comprises less than 30% by weight starch.

18. A food additive comprising at least one protein material,
wherein the protein material has a protein content of at least 50% by weight of the protein material based on total solids content,
wherein the protein material has been homogenized in an aqueous slurry with from about 0.1% to about 3.3% by weight of L-cysteine, or a derivative thereof, based on total solids content of the protein material and reacted under added heat, and
wherein the food additive further comprises an alkaline pH adjusting agent.

19. The food additive of claim 18, wherein the at least one protein material is a plant-based protein.

20. The food additive of claim 19, wherein the plant based protein is selected from the group consisting of grain proteins, pseudocereal proteins, pulse proteins, chia seed, lupin, microalgae, soy, canola, mycoproteins and mixtures thereof.

21. The food additive of claim 19, wherein the plant-based protein comprises a protein derived from wheat, corn, rice, barley, rye, triticale, sorghum, oats, pearl millet, ancient grains, amaranth, buckwheat, quinoa, pea, lentil, faba bean, chickpea, or combinations thereof.

22. The food additive of claim 21, wherein the plant-based protein comprises one or more members selected from the group consisting of wet gluten dough, high-protein wet gluten dough, vital wheat gluten, and wheat protein isolate.

23. The food additive of claim 18, wherein the at least one protein material is an animal-based protein.

24. The food additive of claim 23, wherein the animal-based protein comprises a milk protein or egg protein.

25. The food additive of claim 24, wherein the animal-based protein comprises a milk protein and the milk protein comprises casein, whey, or combinations thereof.

26. The food additive of claim 18, wherein the at least one protein material comprises a mixture of plant-based and animal-based proteins.

27. The food additive of claim 18, wherein the at least one protein material has been treated with from about 0.001% to about 5% by weight of glutaminase or transglutaminase, based on total solids content of the protein material.

28. The food additive of claim 18, wherein the food additive has a protein content of at least 70% by weight.

29. The food additive of claim 18, wherein the food additive comprises an organic or mineral acid.

30. The food additive of claim 29, wherein the organic or mineral acid
is selected from the group consisting of hydrochloric acid, sulfuric acid, acetic acid, lactic acid, malic acid, citric acid, succinic acid, fumaric acid, and combinations thereof.

31. The food additive of claim 18, wherein
the alkaline pH adjusting agent is selected from the group consisting of ammonium hydroxide, sodium hydroxide, potassium hydroxide, calcium hydroxide, magnesium hydroxide, and combinations thereof.

32. The food additive of claim 18, wherein the food additive exhibits at least one improved functional characteristic relative to an otherwise identical food additive comprising a protein material that has not been reacted with the L-cysteine, the at least one improved functional characteristic is selected from the group consisting of:
(a) emulsification capacity,
(b) oil holding capacity,
(c) water holding capacity,
(d) whipping properties,
(e) extensibility,
(f) reduced dough mixing time during bread making,
(d) emulsifier replacement ability,
(g) improved loaf volume in bread making, and
(i) improved cake volume in cake making.

33. The food additive of claim 18, wherein the L-cysteine, or derivative thereof, is plant-derived.

34. The food additive of claim 18, wherein the L-cysteine, or derivative thereof, is animal-derived.

35. The food additive of claim 18, wherein the food additive comprises less than 30% by weight starch.

* * * * *